United States Patent
Kollmann et al.

(10) Patent No.: US 11,426,687 B2
(45) Date of Patent: Aug. 30, 2022

(54) FUEL FILTER

(71) Applicant: Mahle International GmbH, Stuttgart (DE)

(72) Inventors: Andreas Kollmann, Eitweg (AT); Patrick Wieler, Urbach (DE)

(73) Assignee: MAHLE INTERNATIONAL GMBH

( * ) Notice: Subject to any disclaimer, the term of this patent is extended or adjusted under 35 U.S.C. 154(b) by 195 days.

(21) Appl. No.: 16/454,701

(22) Filed: Jun. 27, 2019

(65) Prior Publication Data

US 2020/0406176 A1 Dec. 31, 2020

(51) Int. Cl.
*F02M 37/32* (2019.01)
*F02M 37/24* (2019.01)
(Continued)

(52) U.S. Cl.
CPC ........... *B01D 36/003* (2013.01); *B01D 27/00* (2013.01); *B01D 27/08* (2013.01); *B01D 29/15* (2013.01);
(Continued)

(58) Field of Classification Search
CPC ...... B01D 36/003; B01D 27/00; B01D 27/08; B01D 29/15; B01D 35/30; B01D 29/0093; B01D 35/005; B01D 2265/026; B01D 2201/4061; B01D 2201/30; B01D 2201/295; B01D 2201/40; B01D 2201/29; B01D 36/006; B01D 36/001; B01D 2201/4084; B01D 2201/4092;
(Continued)

(56) References Cited

U.S. PATENT DOCUMENTS 3,312,350 A 4/1967 Kasten
3,465,883 A 9/1969 Jumper
(Continued)

FOREIGN PATENT DOCUMENTS

DE 3903675 A1 8/1990
DE 3941996 A1 6/1991
(Continued)

OTHER PUBLICATIONS

English abstract for DE-102012000876-C5.
(Continued)

*Primary Examiner* — Magali P Slawski
*Assistant Examiner* — Angel Olivera
(74) *Attorney, Agent, or Firm* — Fishman Stewart PLLC

(57) ABSTRACT

A fuel filter assembly includes a filter housing defining a cavity, a center stack having a base component and a top portion. The center stack is positioned within the cavity of the filter housing and attached to the housing, the center stack having an axial aperture in the top portion, the axial aperture having a circumferential surface, and a fuel filter. The fuel filter includes a filter base, an end cap having a top surface and a bottom surface opposite the top surface, an axial extension that extends from the bottom surface, and at least one prong attached to the axial extension, the at least one prong having an axial surface facing away from the top surface that axially locates the fuel filter in the housing against the circumferential surface, a filter element attached to the bottom surface of the end cap, and a pin attached to a filter base.

29 Claims, 20 Drawing Sheets

(51) Int. Cl.
| | |
|---|---|
| *B01D 36/00* | (2006.01) |
| *B01D 35/30* | (2006.01) |
| *B01D 35/16* | (2006.01) |
| *B01D 35/153* | (2006.01) |
| *B01D 35/00* | (2006.01) |
| *B01D 27/00* | (2006.01) |
| *F02M 37/42* | (2019.01) |
| *F02M 37/34* | (2019.01) |
| *B01D 29/15* | (2006.01) |
| *B01D 27/08* | (2006.01) |
| *B01D 29/21* | (2006.01) |

(52) U.S. Cl.
CPC ........... *B01D 35/005* (2013.01); *B01D 35/16* (2013.01); *B01D 35/30* (2013.01); *B01D 36/001* (2013.01); *F02M 37/24* (2019.01); *F02M 37/34* (2019.01); *F02M 37/42* (2019.01); *B01D 29/21* (2013.01); *B01D 35/153* (2013.01); *B01D 36/006* (2013.01); *B01D 2201/0415* (2013.01); *B01D 2201/29* (2013.01); *B01D 2201/295* (2013.01); *B01D 2201/30* (2013.01); *B01D 2201/305* (2013.01); *B01D 2201/316* (2013.01); *B01D 2201/347* (2013.01); *B01D 2201/40* (2013.01); *B01D 2201/4007* (2013.01); *B01D 2201/4061* (2013.01); *B01D 2201/4084* (2013.01); *B01D 2201/4092* (2013.01); *B01D 2265/026* (2013.01); *F02M 37/32* (2019.01)

(58) Field of Classification Search
CPC ...... B01D 2201/347; B01D 2201/0415; B01D 2201/4007; B01D 35/16; B01D 35/153; B01D 29/96; B01D 29/111; B01D 2201/304; B01D 2201/305; B01D 2201/316; B01D 2201/291; B01D 29/21; B01D 29/002; B01D 39/20; B01D 39/2093; B01D 39/2068; B01D 71/02; B01D 71/024; B01D 71/025; B01D 71/027; B01D 71/028; B01D 71/021; B01D 46/2418; B01D 2253/25; B01D 63/066; B01D 67/0088; B01D 2239/0471; B01D 2239/0478; B01D 2239/0485; B01D 63/063; F02M 37/42; F02M 37/34; F02M 37/24; F02M 37/32; C04B 38/0006; C04B 38/0096
See application file for complete search history.

(56) References Cited

U.S. PATENT DOCUMENTS

| | | | |
|---|---|---|---|
| 3,502,218 A | 3/1970 | Tuffnell et al. | |
| 4,497,714 A | 2/1985 | Harris | |
| 4,502,955 A | 3/1985 | Schaupp | |
| 4,619,764 A | 10/1986 | Church et al. | |
| 5,089,129 A | 2/1992 | Brigman | |
| 5,548,893 A | 8/1996 | Koelfgen | |
| 5,814,215 A | 9/1998 | Bruss et al. | |
| 6,139,738 A | 10/2000 | Maxwell | |
| 6,251,273 B1 | 6/2001 | Jawurek et al. | |
| 6,409,804 B1 | 6/2002 | Cook et al. | |
| 6,706,181 B1 | 3/2004 | Baumann et al. | |
| 6,835,305 B1 | 12/2004 | Baumann et al. | |
| 6,936,169 B2 | 8/2005 | Baumann et al. | |
| 7,237,681 B2 | 7/2007 | Brieden et al. | |
| 7,527,739 B2 | 5/2009 | Jiang et al. | |
| 8,673,138 B2 | 3/2014 | Braunheim | |
| 9,108,125 B2 | 8/2015 | Braunheim | |
| 9,205,355 B2 | 12/2015 | Deschamps et al. | |
| 9,254,456 B2 | 2/2016 | Ardes | |
| 9,320,992 B2 | 4/2016 | Braunheim | |
| 9,333,448 B2 | 5/2016 | Braunheim et al. | |
| 9,810,373 B2 | 11/2017 | Braunheim | |
| 10,035,090 B2 | 7/2018 | Kollmann et al. | |
| 10,371,108 B2 | 8/2019 | Braunheim | |
| 10,406,462 B2 | 9/2019 | Kollmann et al. | |
| 2005/0274664 A1 | 12/2005 | Stoehr et al. | |
| 2007/0084776 A1 | 4/2007 | Sasur | |
| 2007/0240390 A1 | 10/2007 | Becker et al. | |
| 2008/0024719 A1 | 1/2008 | Kamishita et al. | |
| 2009/0008321 A1 | 1/2009 | Tanner et al. | |
| 2011/0017649 A1 | 1/2011 | Sasur | |
| 2011/0089091 A1 | 4/2011 | Grass et al. | |
| 2014/0183116 A1* | 7/2014 | Ardes | B01D 29/88 210/234 |
| 2017/0080366 A1* | 3/2017 | Braunheim | B01D 35/30 |

FOREIGN PATENT DOCUMENTS

| | | |
|---|---|---|
| DE | 19707132 A1 | 8/1998 |
| DE | 19904981 A1 | 8/2000 |
| DE | 19951085 A1 | 4/2001 |
| DE | 10308427 A1 | 9/2004 |
| DE | 102005000658 A1 | 7/2006 |
| DE | 102005015194 A1 | 10/2006 |
| DE | 202006006084 U1 | 8/2007 |
| DE | 202006017305 U1 | 3/2008 |
| DE | 102007048550 A1 | 4/2008 |
| DE | 102007009352 A1 | 8/2008 |
| DE | 102008011616 A1 | 9/2008 |
| DE | 102009024699 A1 | 12/2010 |
| DE | 102013202446 A1 * | 8/2014 ............. B01D 29/21 |
| DE | 102012000876 C5 | 10/2014 |
| DE | 102019105255 A1 | 9/2020 |
| EP | 0260069 A2 | 3/1988 |
| EP | 0385113 A2 | 9/1990 |
| EP | 0405447 A2 | 1/1991 |
| EP | 1233173 A2 | 8/2002 |
| EP | 1695753 A1 | 8/2006 |
| JP | H7217577 A | 8/1995 |
| WO | 0110533 A1 | 2/2001 |
| WO | 2005123216 A1 | 12/2005 |
| WO | 2006105755 A1 | 10/2006 |
| WO | 2009080455 A1 | 7/2009 |

OTHER PUBLICATIONS

English abstract for DE 3903675 A1.
English abstract for DE-102009024699-A1.
English abstract for DE-19904981-A1.
English abstract for DE-102008011616-A1.
English Translation of DE 10 2005 000 658 A1.
Abstract of DE 103 08 427 A1.
Abstract of DE 10 2007 039679 A1 equivalent application to DE 20 2006 017 305 A1.
Abstract for DE 39 41 996 A1 of equivalent application EP 0433664.
Abstract of DE 10 2007 039679 A1 equivalent application to DE 39 41 996 A1.
Abstract of DE 10 2007 009 352 A1.
Abstract of DE 199 51 085 A1.
Abstract DE 10 2005 015 194 A1.
Abstract JP 7217577.
International Search Report PCT/EP2010/062585, dated Dec. 6, 2010.
English abstract for EP-0385113.
Search Report for EP-10751600.7.
English abstract for EP-1233173.
English abstract for DE-102007048550.
English Abstract EP1695753.

* cited by examiner

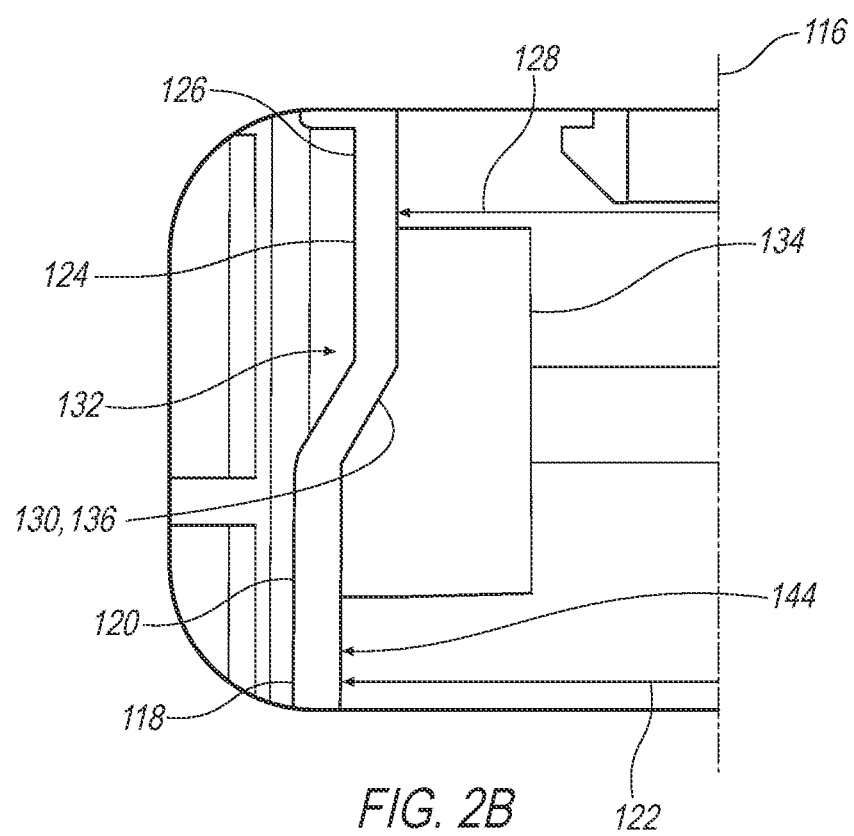

FUEL FILTER

TECHNICAL FIELD

The present disclosure relates to a fuel filter for an internal combustion engine of a motor vehicle.

BACKGROUND

Fuel filters can be found in any motor vehicle that includes an internal combustion engine, and serve for filtering out different contaminants from the fuel such as water and solid particles, as examples. Contaminants may include water and particulates, as examples.

Particulates, for instance, can be introduced into the fuel stream in a variety of ways, such as dirt or rust while filling the tank, or from the fuel itself if from an unfiltered source. Particulates can be abrasive and can cause rapid wear and failure of engine components, such as the fuel pump and injectors. Filters often therefore typically include a particulate filter element (i.e., paper), which allows passage of the fuel (and any water present), while capturing the particulate matter.

Water in the fuel can result in corrosion or impairment of engine performance. If water gets into a moving part, such as an injector valve, the part can overheat or wear excessively, leading to early life failure of the engine. Or, water can cause rust and corrosion if present in the fuel stream. Particular attention is therefore paid to filtering out water from the fuel to be combusted. Water content is generally present to some extent in all fuels, but can be high in modern biofuels such as, for example, biodiesel, because biofuels can be hygroscopic (i.e., water absorbing). Thus, often fuel particulate filters are combined with water separators to achieve low particulate with minimal water content.

Due to its greater density than fuel, separated water may be collected in suitable water collection chambers of the water separator and may be periodically discharged. Often, because of the density difference between water and fuel, the water separator is located at the base of a filter element, which may thereby include a particulate filter element (i.e., paper) and a water separator. And, although water separated from the fuel may typically be discharged via a valve (either on a regularly scheduled basis, or based on a sensed amount of water), the paper portion of the filter element may become clogged with particulate, which can result in decreased engine performance.

As such, fuel filters are typically changed at regular intervals during the life of the engine as routine maintenance. However, routine changing of filters can inadvertently damage the engine if not installed properly. Some filter designs include insertion devices to aid in the insertion of filters into a housing. For instance, fuel filters may include an axially protruding pin that is used to close a run-off channel. The pin fits snugly within the channel and typically includes an O-ring or other sealing element to prevent drainage during engine use. Fluid access to the channel occurs when the pin is removed from the channel (i.e., by pulling out the filter from its cavity). Thus, installation of such a filter includes proper alignment of the pin with the channel. In some known designs the pin is visually aligned with the channel. However, it may be difficult to see or "feel" such alignment, and if a proper technique is not developed, the pin or filter may be damaged during installation.

One known design for aligning the pin in the channel includes using a spherical ramp that the pin rests against while the filter is rotated. A run-off or receiving channel is positioned at the end of the ramp, such that the pin passes off the ramp and into the channel during manual rotation of the filter. However, although such designs have been effectively used for years, such a design may include imparting excessive rotational torque to the filter during its installation. Friction on the ramp, or simply improperly using the pin-ramp combination, can thereby result in stress being introduced to the pin or other components of the filter during installation.

For instance, careless installation may include pressing down on the filter, which can put pressure on the pin while the pin is slid along the channel. The pin may thereby miss or overshoot the channel, or in some instances the pin can become bound up against the ramp. In an extreme example, it is possible for the pin to snap off, which not only ruins the filter, but may also leave the pin behind within a cavity where the filter is to be installed. Worse yet, if the pin snaps off within the channel, then engine repairs may be necessary to remove the broken pin from the channel.

Filters may be damaged during installation for other reasons, as well. For instance, if components do not properly align in an axial direction, then tolerance stack-ups may result in improper axial location of components and improper sealing or fitting with other mating components of the housing or cavity in which the filter is placed. Radial play of the filter with respect to its housing can result in axial misalignment of the pin within its channel, or angular misalignment of the filter in the housing. Filters may also be cocked with respect to the housing, as well, which can cause the filter to bind up within the housing and cause damage.

Thus, a seemingly simple and relatively inexpensive operation of installing a filter can include challenges that can result in costly damages. Because of the generally routine nature of filter installation and even after many such installations, vehicle owners, mechanics or engine repair technicians may thereby install a filter in such a fashion that can include damage not only to the filter, but to the engine as well.

As such, there is a need to for an improved design and method of installing a fuel filter.

BRIEF DESCRIPTION OF THE DRAWINGS

FIG. 2B is a plan view of a sword of FIG. 2A;

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1:
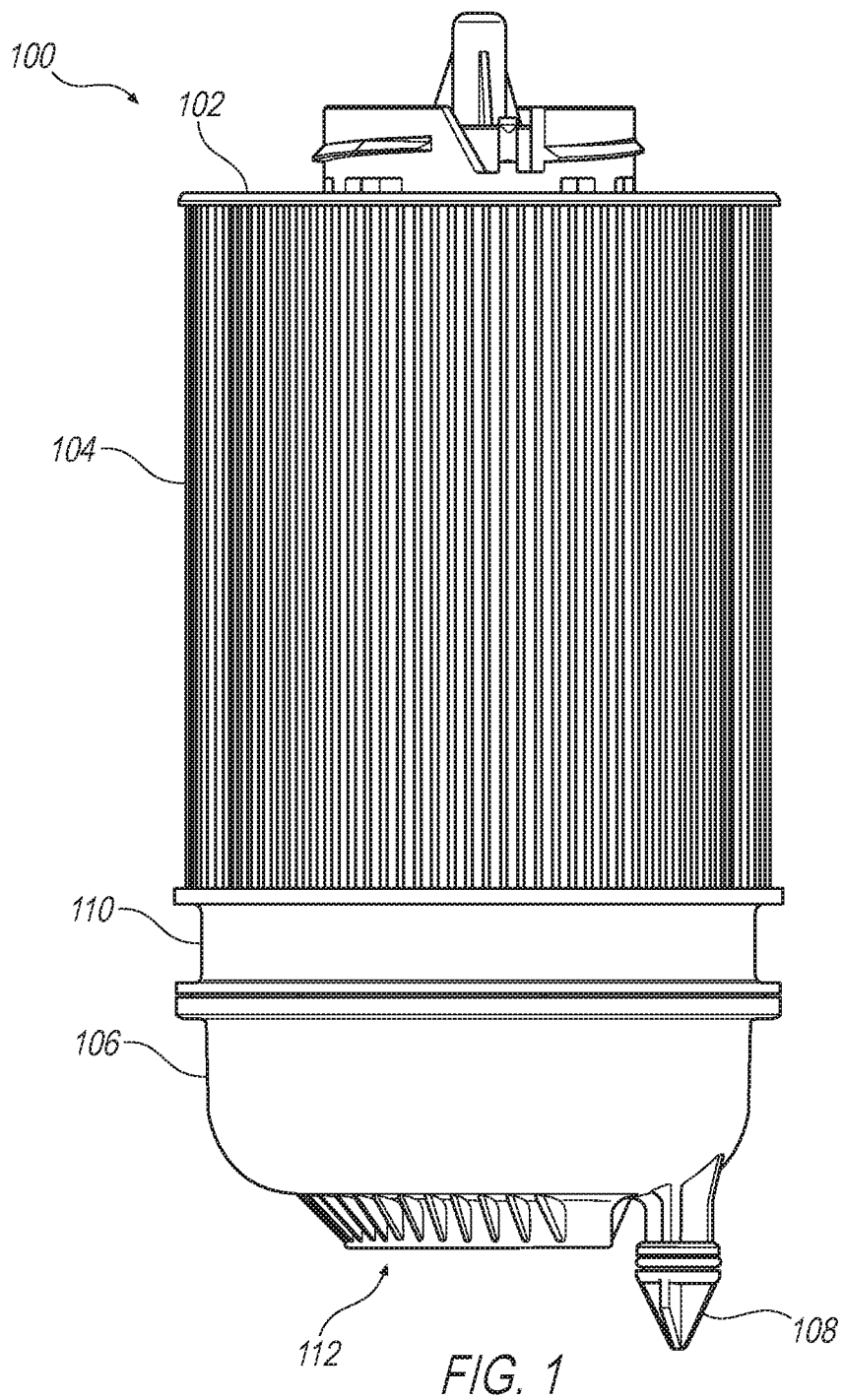
FIG. 1 shows a fuel filter according to the disclosure.
Figure 2A:
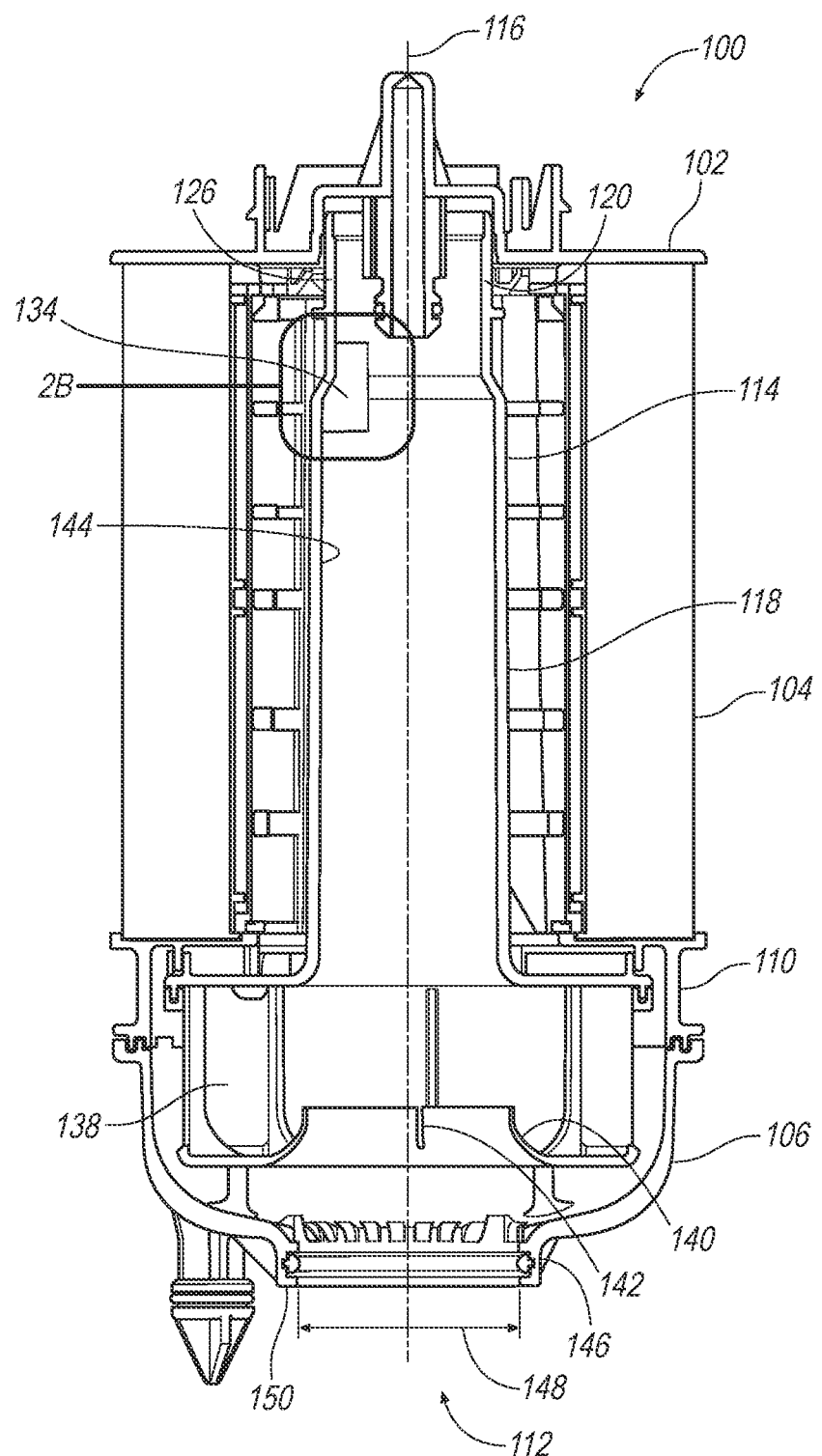
FIG. 2A shows a cross-sectional view of the fuel filter of FIG. 1.

FIG. 1 shows an exemplary fuel filter 100 according to the disclosure, and FIG. 2A shows a cross-sectional view of fuel filter 100. Fuel filter 100 includes an exemplary end cap 102, a filter element 104, a water separator 106, and a pin 108, with a transition piece 110 that extends between filter element 104 and water separator 106 and supports water separator 106. In one example and as will be discussed, water separator 106 may not be present, such as in an application when a water separator is not used or present in fuel filter 100. In such an example a space may be provided so that fuel filter 100 thereby occupies the same footprint or profile. Filter element 104 includes a hole or opening 112 at its base, passing through water separator 106 and a filter center support 114. Water separator 106 includes pin 108 for positioning within a channel of a housing, as will be further discussed. A center line 116 defines a central axis of fuel filter 100. Filter center support 114 includes a first portion 118 that includes a first wall 120 that is at a first radial dimension 122, and a second portion 124 that includes a second wall 126 that is at a second radial dimension 128, with second radial dimension 128 less than first radial dimension 122. An annular or conical surface 130 extends between first portion 118 and second portion 124, forming a stepped portion 132 therebetween. A sword 134 is positioned at stepped portion 132 and spans from first wall 120 to second wall 126.

FIG. 2B is a plan view of sword 134. Sword 134 extends along an inner surface 136 of conical surface 130. Sword 134 also extends to either axial side of inner surface 136. Sword 134 is positioned at an angular orientation, as viewed from above or below fuel filter 100, and with respect to pin 108, so that pin 108 (see e.g., FIG. 1) finds its hole in a housing when sword 134 is positioned within a slot, as will be discussed. First portion 118 includes an inner surface 144.

Referring again to FIG. 2A, a filter base 146 includes an inner diameter 148 and a bottom surface 150. Water separator 106 is positioned at the bottom of fuel filter 100 and in one example is attached to transition piece 100. That is, generally, water separator 106 is positioned between bottom surface 150 and filter element 104. Water separator 106 includes an annular, hydrophobic diaphragm 138 arranged in a similar orientation as filter element 104, and which is generally permeable for fuel but is generally impermeable for water. Fuel filter 100 includes an inner seal 140 that includes sealing slots 142.

Figure 3A:
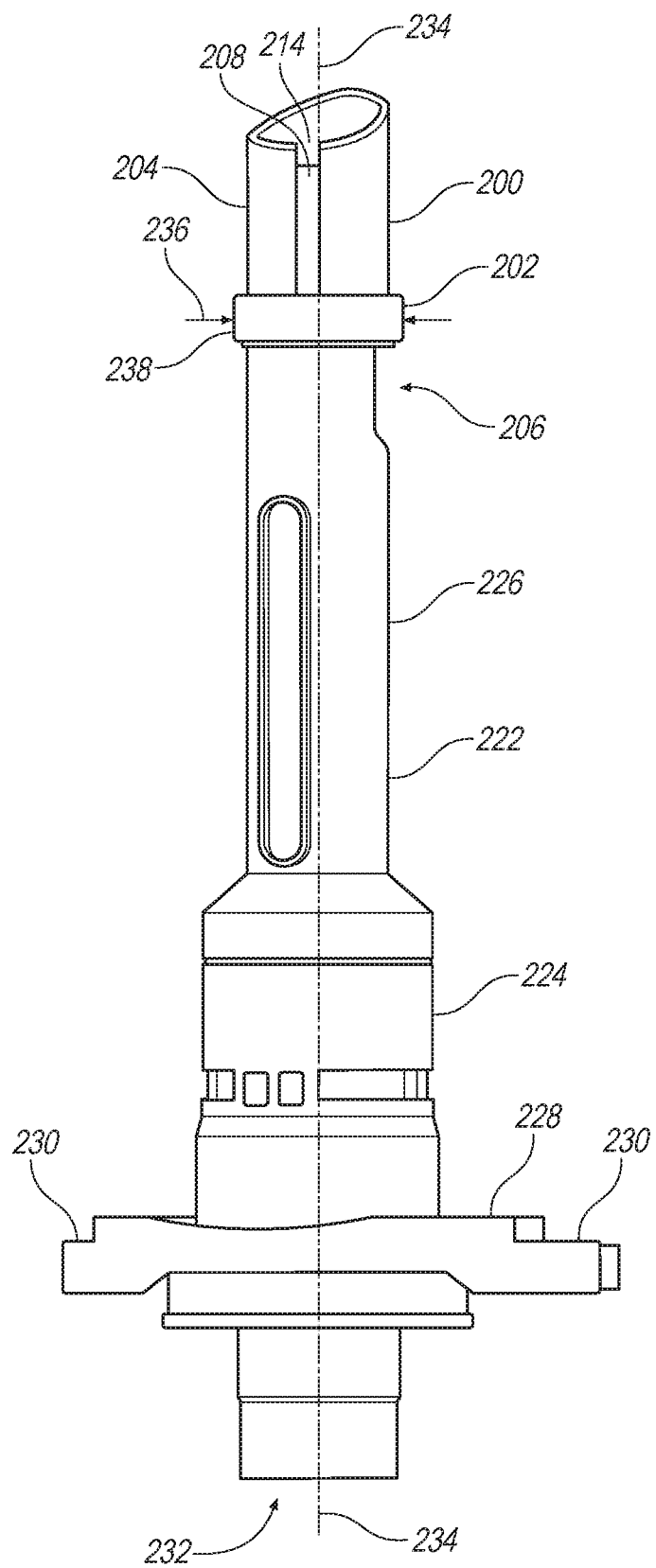
FIG. 3A shows a center stack according to the disclosure.
Figure 3B:
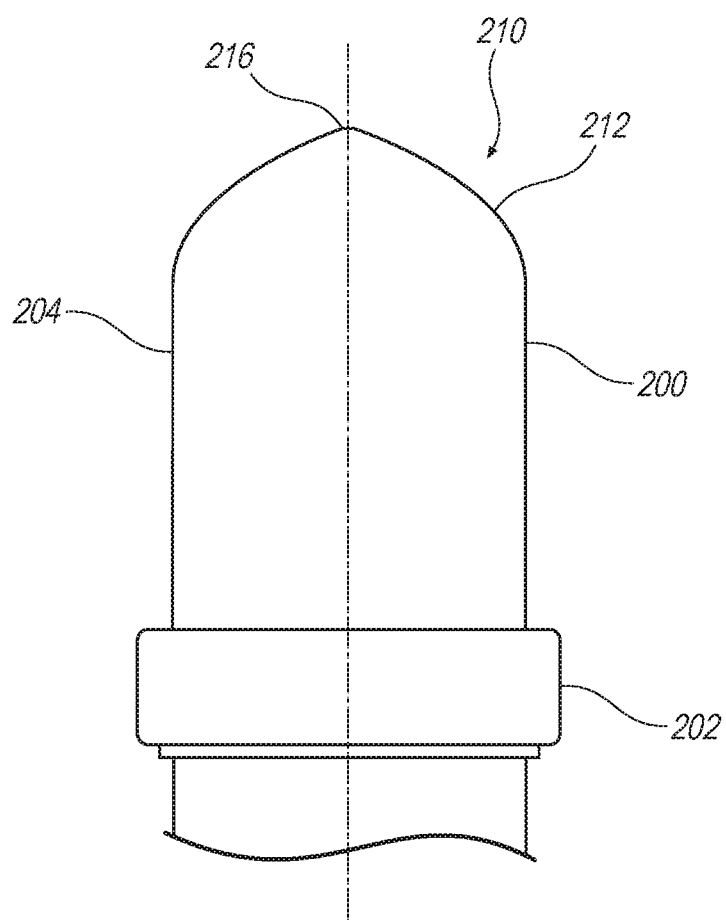
FIG. 3B shows a back side of a top portion of the center stack of FIG. 3A
Figure 3C:
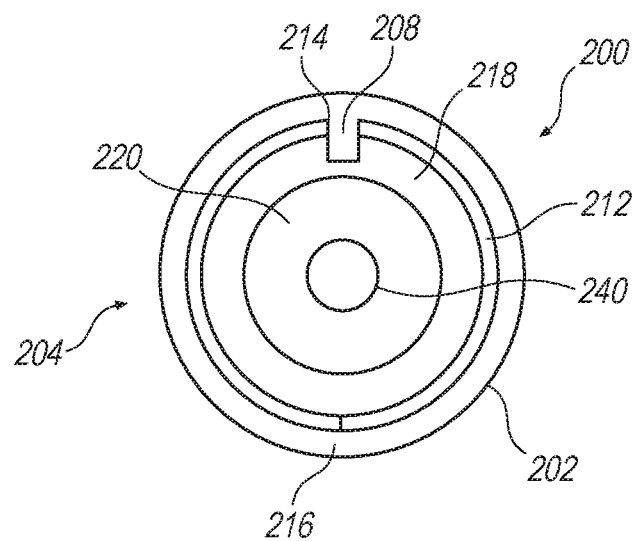
FIG. 3C shows a plan or top view of the top portion shown in FIG. 3B.

FIG. 3A shows a center stack 200, according to the disclosure. Center stack 200 is sometimes also referred to as a functional carrier. Center stack 200 includes a radial extension 202 and a top portion 204 above radial extension 202 that is proximate to a fuel access aperture 206. Top portion 204 includes a slot 208 that extends upward from radial extension 202 to an upper end 210 of center stack 200. FIG. 3B shows a back side of top portion 204 of FIG. 3A, so slot 208 is not visible in FIG. 3B. Top portion 204 includes a curved surface 212 that extends about and forms a circumference of upper end 210. Curved surface 212 is curved such that it extends axially upward from slot 208, where it begins at a minimum axial height 214, and as curved surface 212 passes or extends circumferentially and to either side of slot 208, curved surface 212 forms a maximum axial location 216 at a location 180° removed from slot 208, which in turn defines minimum axial height 214. A plan or top view of top portion 204 and curved surface 212 is shown in FIG. 3C, having center stack 200 with slot 208 and maximum axial location 216 opposite slot 208 and about curved surface 212. A flat circumferential surface 218 is inboard of curved surface 212 and an aperture 220 is inboard of flat circumferential surface 218.

Referring again to FIG. 3A, center stack 200 includes an extended portion 222 that extends from radial extension 202 to a center stack base 224, extended portion 222 having an outer surface 226. A base component 228 includes attachment locations 230, illustrated as holes, for attachment of center stack 200 to a structure such as a filter housing. A fuel discharge port 232 is at the base of center stack 200. A center stack center line 234 defines a central axis of center stack 200. Radial extension 202 includes an outer diameter 236 that defines an outer surface 238 of radial extension 202, and defined about center stack center line 234.

Referring to FIG. 2A and FIG. 3A, inner seal 140 of fuel filter 100 is made of a flexible material such as plastic, and inner seal 140 engages with center stack base 224 when fuel filter 100 is installed within a housing. Inner seal 140 includes sealing slots 142 that provide flexibility to inner seal 140 such that a seal is formed that prevents liquid from passing thereby. That is, inner seal 140 includes an inner diameter such that a minor interference is formed between inner seal 140 and center stack base 224.

Figure 4A:
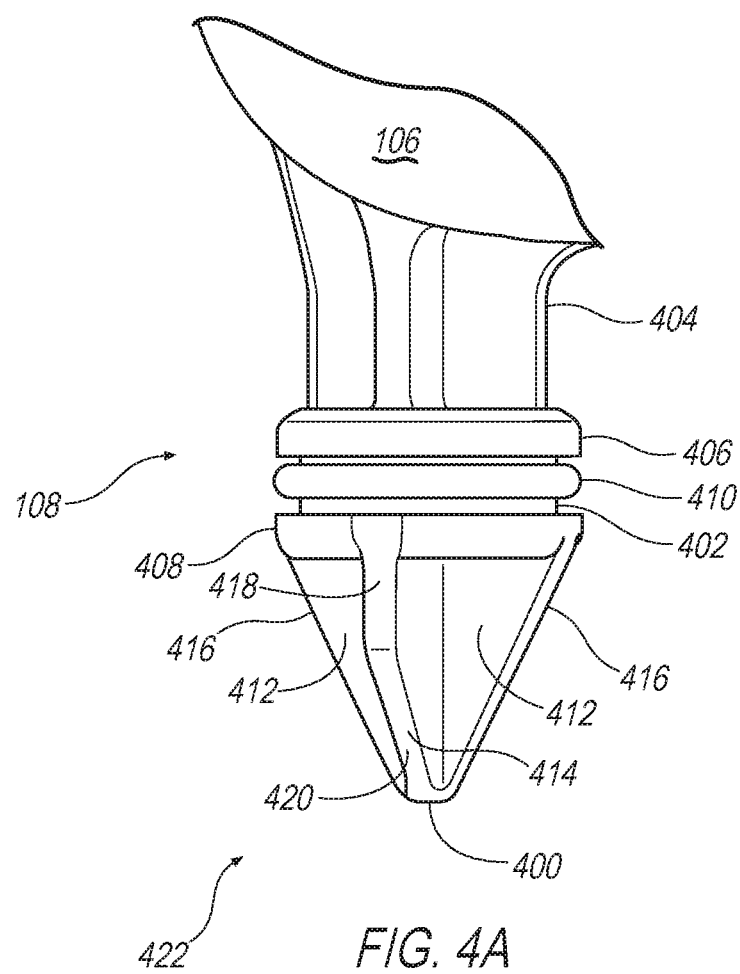
FIG. 4A represents a first profile that is a circumferential view of the pin.
Figure 4B:
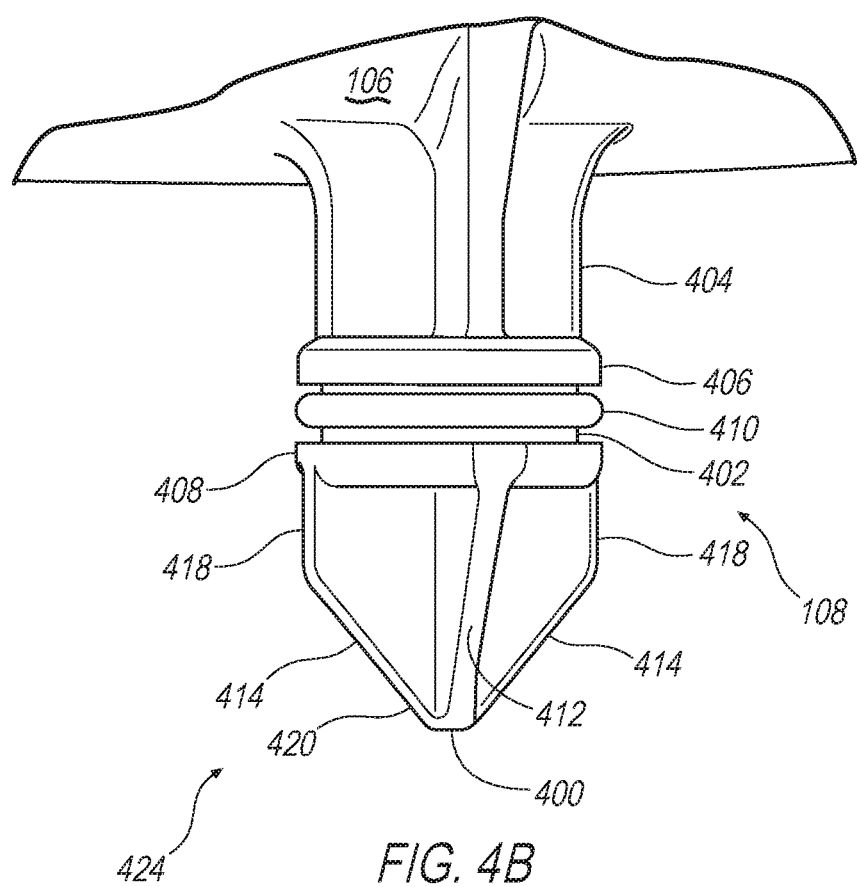
FIG. 4B represents a second profile that is a radial view of the pin.

FIGS. 4A and 4B show orthogonal views of pin 108 attached to water separator 106 and having a point 400. FIG. 4A represents a first profile that is a circumferential view of pin 108, and FIG. 4B represents a second profile that is a radial view of pin 108.

Pin 108 includes a groove 402 for an O-ring, a shaft 404, a first lip 406, and a second lip 408. Groove 402 is formed between first lip 406 and second lip 408, and an O-ring 410 may be positioned therebetween and in groove 402. As illustrated, pin 108 includes two sets of fins that extend from second lip 408 to point 400. First fins 412 are visible in profile in FIG. 4A, and second fins 414 are visible in profile in FIG. 4B. First fins 412 extend along a single flat 416, whereas second fins 414 include axial portions 418 and angled flats 420. Thus, FIG. 4A represents a first profile 422 that is a circumferential view of pin 108, and FIG. 4B represents a second profile 424 that is a radial view of pin 108. Further, although point 400 is referred to as a point, it is contemplated that point 400, according to one aspect, includes a generally flat surface that is formed at the confluence of first fins 412 and second fins 414.

Figure 5:
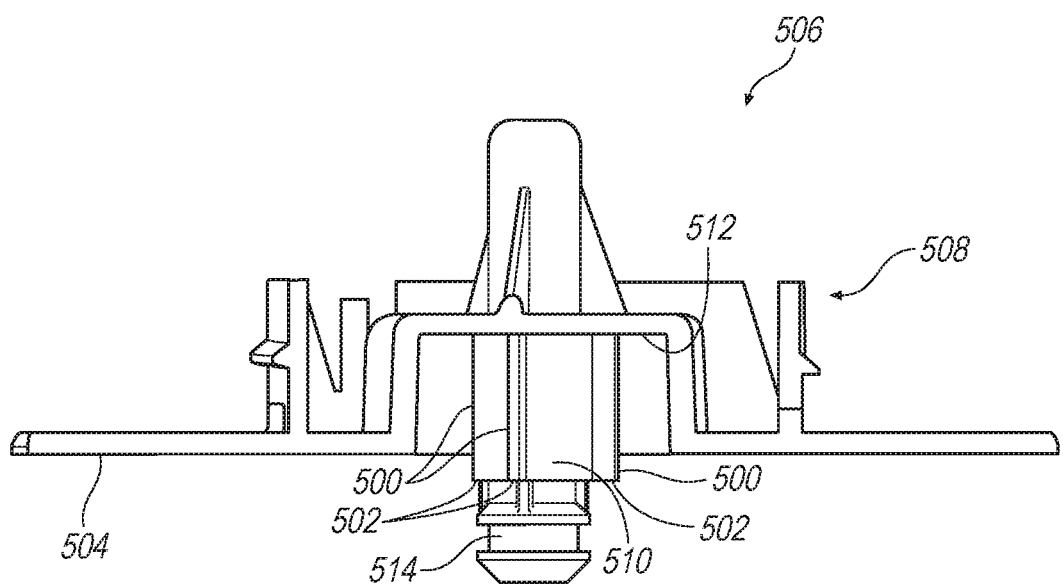
FIG. 5 shows an end cap of the fuel filter of FIG. 1.

FIG. 5 shows end cap 102. End cap 102 includes, in the illustrated example, three prongs 500 that extend both axially and radially. It is contemplated, however, that more or less than three prongs may be used, and that only one may be used to sufficiently axially locate end cap 102. Prongs 500 each include respective circumferential surfaces 502 that, in one example, are flat. End cap 102 includes an endcap undersurface 504. A top surface 506 includes engagement features 508 for engagement of a cover (not shown) with fuel filter 100. Engagement features 508 engage with features on an underside of the cover and capture fuel filter 100 during installation into a housing. An axial extension 510 extends from an underside 512 of end cap 102 and is integral thereto. Axial extension 510 includes a groove 514 for an O-ring, and the axial extension is positioned within a hole or aperture 240 as seen in FIG. 3C.

Figure 6:
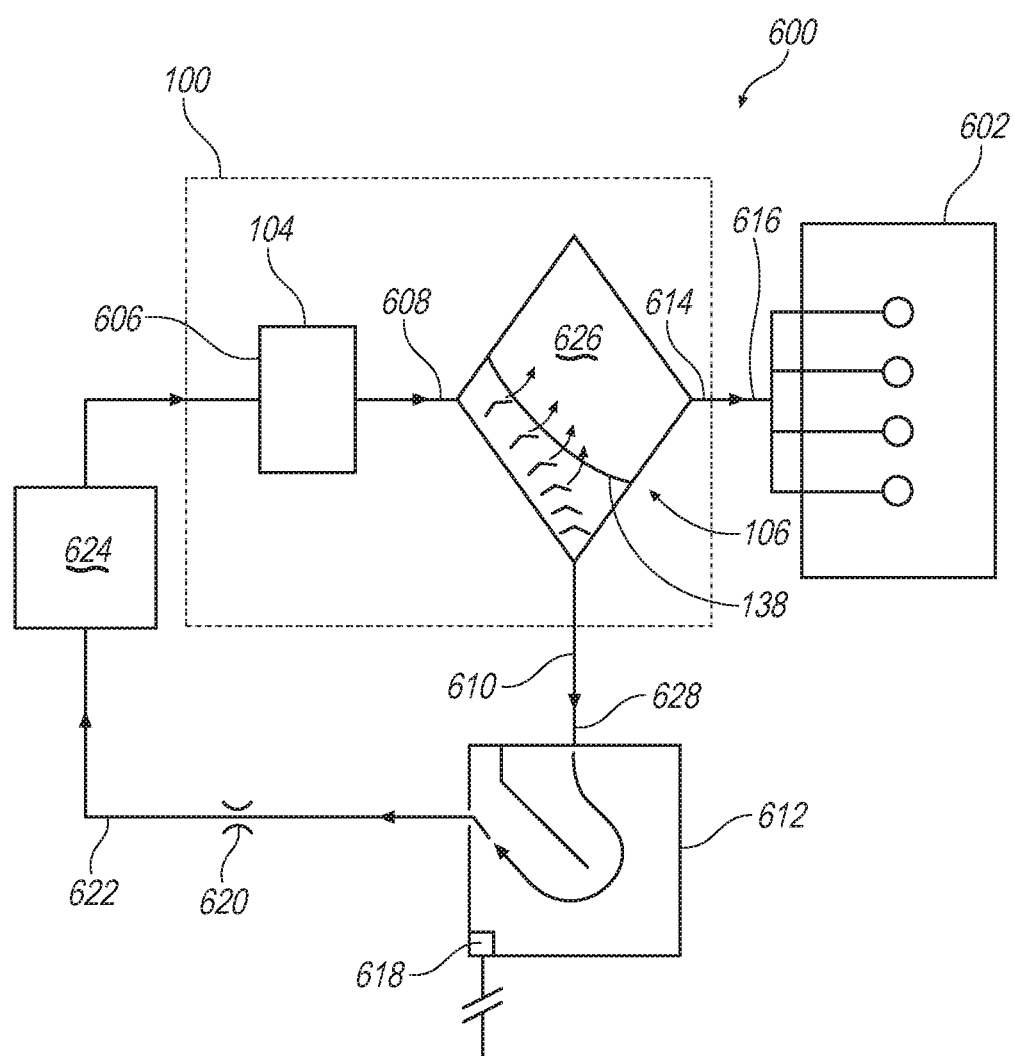
FIG. 6 is a symbolic representation of a fuel system that includes the fuel filter of FIG. 1.
Figure 7:
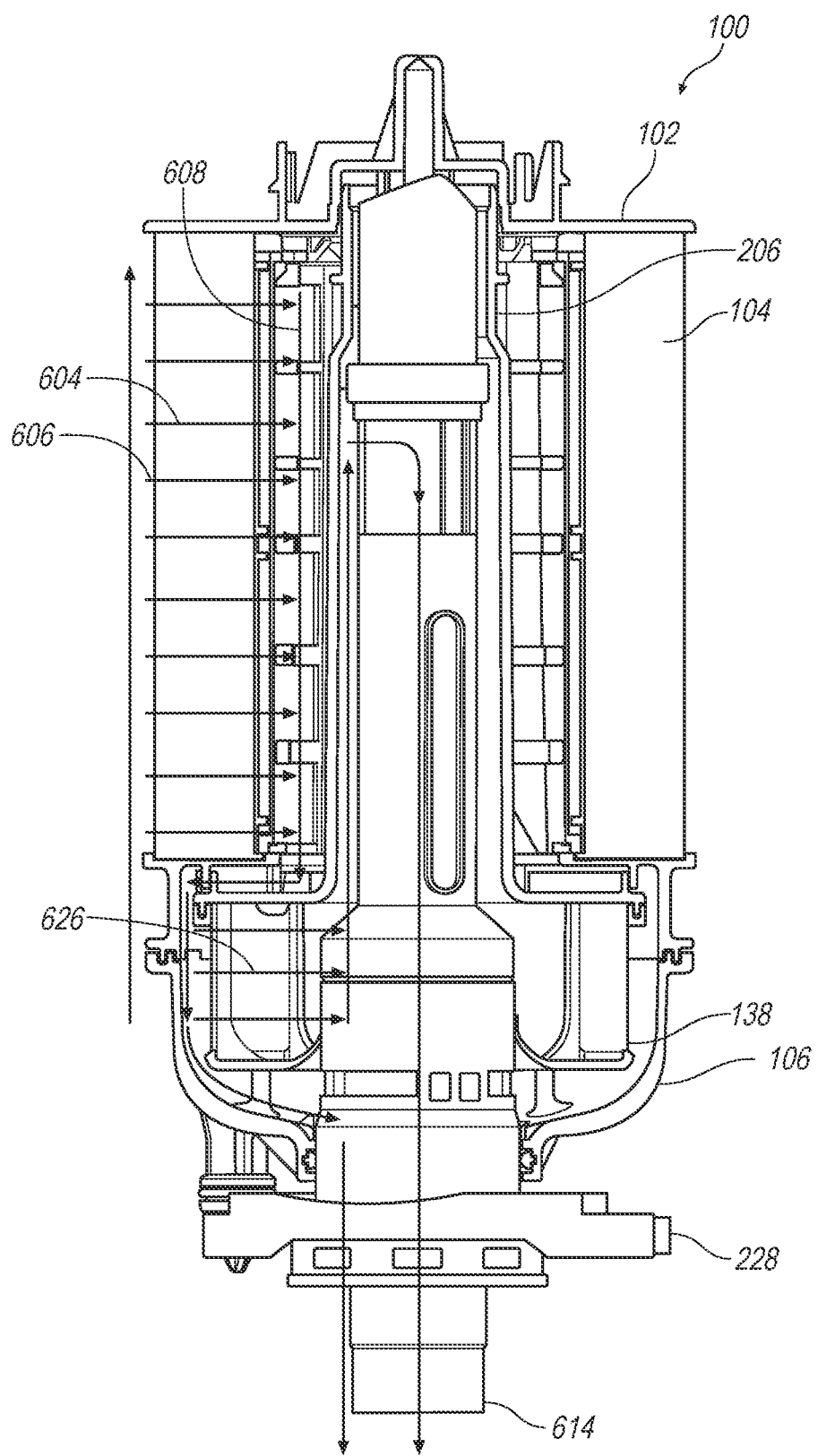
FIG. 7 shows a cross-sectional view of the fuel filter and having the center stack positioned therein.

FIG. 6 is a symbolic representation of a fuel system that includes a fuel filter, such as fuel filter 100, and its components positioned therein. FIG. 7 correspondingly shows a cross-sectional view of fuel filter 100 and having center stack 200 positioned therein for discussion purposes.

A fuel supply system 600 for an internal combustion engine 602 includes fuel filter 100 for removing contaminants that may include solid particles and water. The solid particles, or sediment, and the water are separated from a fuel to be supplied to internal combustion engine 602 for combustion. Flow direction of fuel in fuel supply system 600 is illustrated by corresponding arrows in the various flow lines. Fuel filter 100 includes filter element 104 for particulate filtration when arranged in a filter outer housing, not shown, which is penetrated by a flow in a radial direction 604 from a raw end 606 to a particle-free end 608. Fuel filter 100 includes water separator 106 which is arranged, in one example, gravitationally below filter element 104, and which is formed as the illustrated annular filter.

Water separator 106 includes annular, hydrophobic diaphragm 138 which is arranged in a similar orientation as filter element 104, and which is generally permeable for fuel but is generally impermeable for water. Thus, water present in the fuel is coalesced or collected at hydrophobic diaphragm 138 and upon reaching a certain drop size is discharged as principally discharged water 610, but may include some fuel, downward and to a second water separator 612. Water-free and sediment-free fuel 614 (pure fuel) thereby passes via a fuel line 616 to internal combustion engine 602.

Discharged water 610, including some fuel, passes to second water separator 612, which is connected in series to water separator 106 and is formed in a smooth-flow manner and arranged below first water separator 106. Second water separator 612 is illustrated in fuel supply system 600 and separate from fuel filter 100. Smooth-flow means in this case that discharged water 610 flowing through second water separator 612 flows laminarly, that is, without turbulence and thus allows separation of the water from any fuel passing therethrough. Water separated in second water separator 612 is collected in a water collection chamber 618 and is drained as needed.

Discharging fuel from second water separator 612 takes place by means of a pressure differential present or generated in fuel supply system 600. For example, fuel in fuel supply system 600, which in this example is pressurized, can be discharged via a throttle device 620 into a low pressure or pressure-less return line 622 passing to a fuel tank 624. Additionally or alternatively to this, discharging fuel from second water separator 612 can take place via a venturi nozzle ejector pump (not illustrated) arranged in an inlet line, such as return line 622, of fuel filter 100. It is contemplated that flow in second water separator 612 remains laminar, which is the case if an amount of discharged fuel from second water separator 612 is much smaller than flow through fuel filter 100 and water separator 106.

Depending on the size and flow through fuel filter 100, a flow through second water separator 612 which is lower by a factor of approximately $\frac{1}{20}$ to $\frac{1}{200}$, in one example, provides good conditions for a laminar flow and depending on the flow passageway dimensions, etc . . . It is contemplated, however, that the desired flow characteristics may be present in different flow arrangements and that laminar flow may be achieved with other designs and conditions of operation. Water discharged through water collection chamber 618 may be controlled via one, or more than one (such as for redundancy), valves.

Thus, in operation, raw fuel (which may contain water and/or sediment) passes from fuel tank 624 and to raw end 606. The raw fuel passes radially 604 and inwardly through filter element 104, wherein sediment or particulate is removed via filter element 104. At this stage in the flow, water present generally passes through filter element 104 to particle-free end 608, and thus a particle-free fuel-water mixture thereby flows from particle-free end 608 downward to water separator 106. The fuel-water mixture encounters hydrophobic diaphragm 138, and pressure in the particle-free fuel-water mixture thereby causes fuel to pass through hydrophobic diaphragm 138, but the hydrophobic nature of hydrophobic diaphragm 138 prevents water from passing through. As such, water-free and sediment-free fuel, or pure fuel 626, passes through hydrophobic diaphragm 138, while generally water passes as discharge 610 into a discharge aperture 628. Discharge 610 includes fluid that encountered and did not pass through hydrophobic diaphragm 138, which is generally water, but a substantial fraction of fuel may also be present.

Water-free and sediment-free fuel 626 passes radially inward and after having passed through hydrophobic diaphragm 138. Water-free and sediment-free fuel 626 thereby encounters inner seal 140 which is compressed against center stack base 224 and due to the minor interference therewith. Because of the sealing effect, little if any water-free and sediment-free fuel 626 passes through the seal formed. However, should any water-free and sediment-free fuel 626 pass thereby, it will join with discharged water 610 and ultimately pass back to fuel tank 624, where it will pass again to fuel filter 100. Thus, any inadvertent leakage of water-free and sediment-free fuel through inner seal 140 will not result in lost fuel.

Discharge 610 thereby passes to second water separator 612 where further separation of fuel and water occurs. Primarily water is discharged at water collection chamber 618, and any remainder (having some fuel) passes via throttle device 620 to fuel tank 624, whereby it again passes through filter supply system 600.

Referring back to FIGS. 2A and 3A, within fuel filter 100 and particularly center stack 200, pure fuel 626 passes toward outer surface 226 of center stack 200 and along inner surface 144 of filter center support 114, is directed upward, toward, and then into fuel access aperture 206, thereby passing into a hollow center of extended portion 222, and passing to fuel discharge port 232 and then to internal combustion engine 602 via fuel line 616.

Center stack 200 and fuel filter 100 include assembly features described herein. As seen in FIG. 3A, center stack 200 includes extended portion 222 and fuel access aperture 206. Extended portion 222 includes a hollow center (not visible) that passes from fuel access aperture 222, through the hollow center, and to an exit or fuel discharge port 232.

Figure 8:
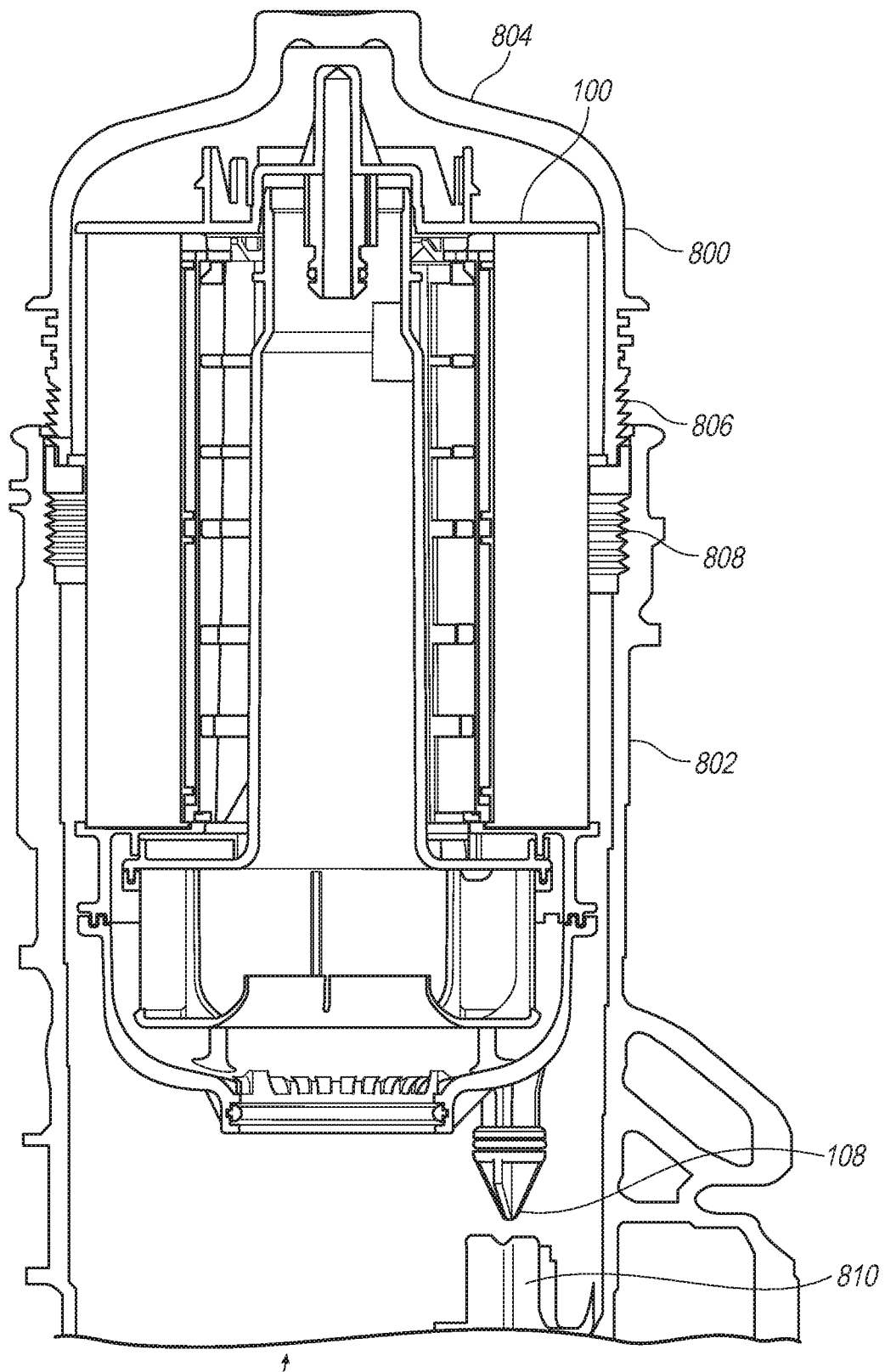
FIG. 8 shows the fuel filter in a housing.

FIG. 8 shows fuel filter 100 within a housing 800. Housing 800 includes a housing base 802 having walls that define a cavity, and a cover 804. Cover 804 includes threads 806, and housing base 802 includes threads 808. When fuel filter 100 is installed into housing 800, cover 804 provides a sealing effect, and center stack 200 is positioned therein. Housing 800 includes a channel 810, into which pin 108 fits when filter 100 is properly aligned with housing 800, providing a sealing effect.

FIGS. 9A through 9E show progressive steps of an illustrative assembly of the fuel filter into its housing. Such assembly includes positioning fuel filter 100 into housing 800, but the housing is not shown in FIGS. 9A-9E solely for illustration purposes. When fuel filter 100 is installed within its housing, an important feature is that the two items (i.e., fuel filter 100 and housing 800) be rotationally oriented with respect to each other so that pin 108 is positioned within its corresponding hole (not shown) within housing 800. To do so, a unique set of features is provided, according to the disclosure, which ensures proper orientation of the filter to properly align pin 108 with its hole and to avoid damage to any of the components. Assembly of fuel filter 100 onto center stack 200 proceeds as follows.

Figure 9A:
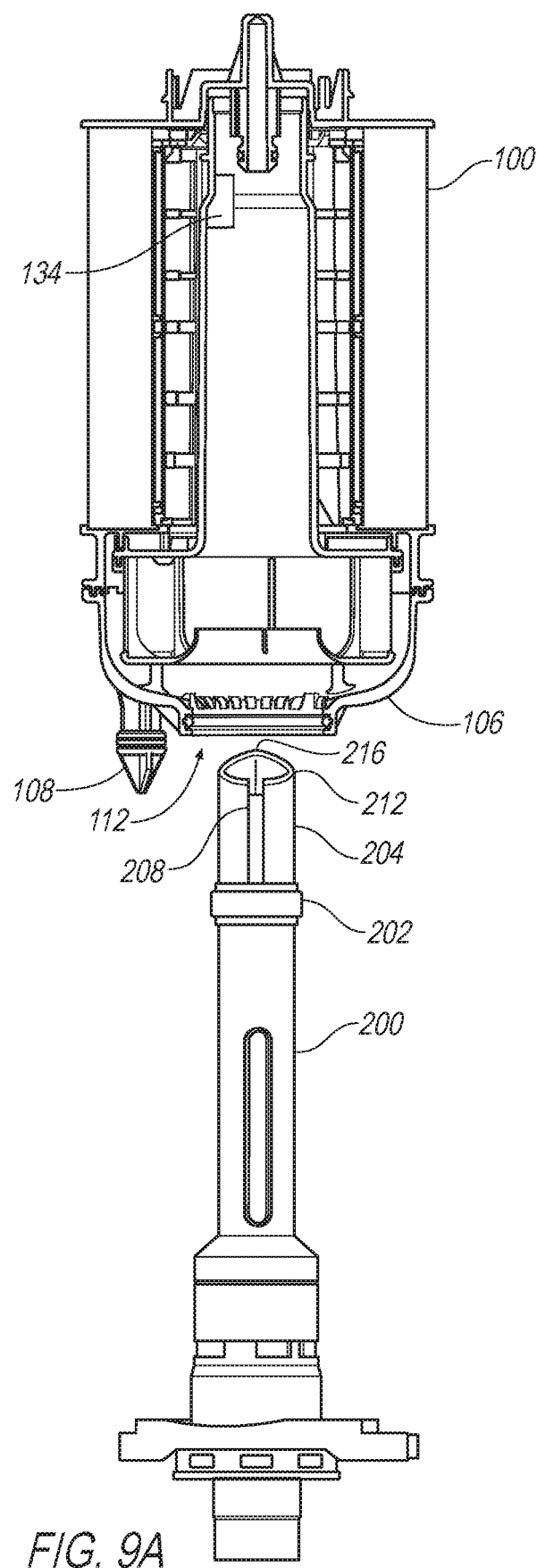
FIGS. 9A through 9E show progressive steps of assembly of the center stack of FIG. 3A into the fuel filter of FIG. 1.
Figure 9B:
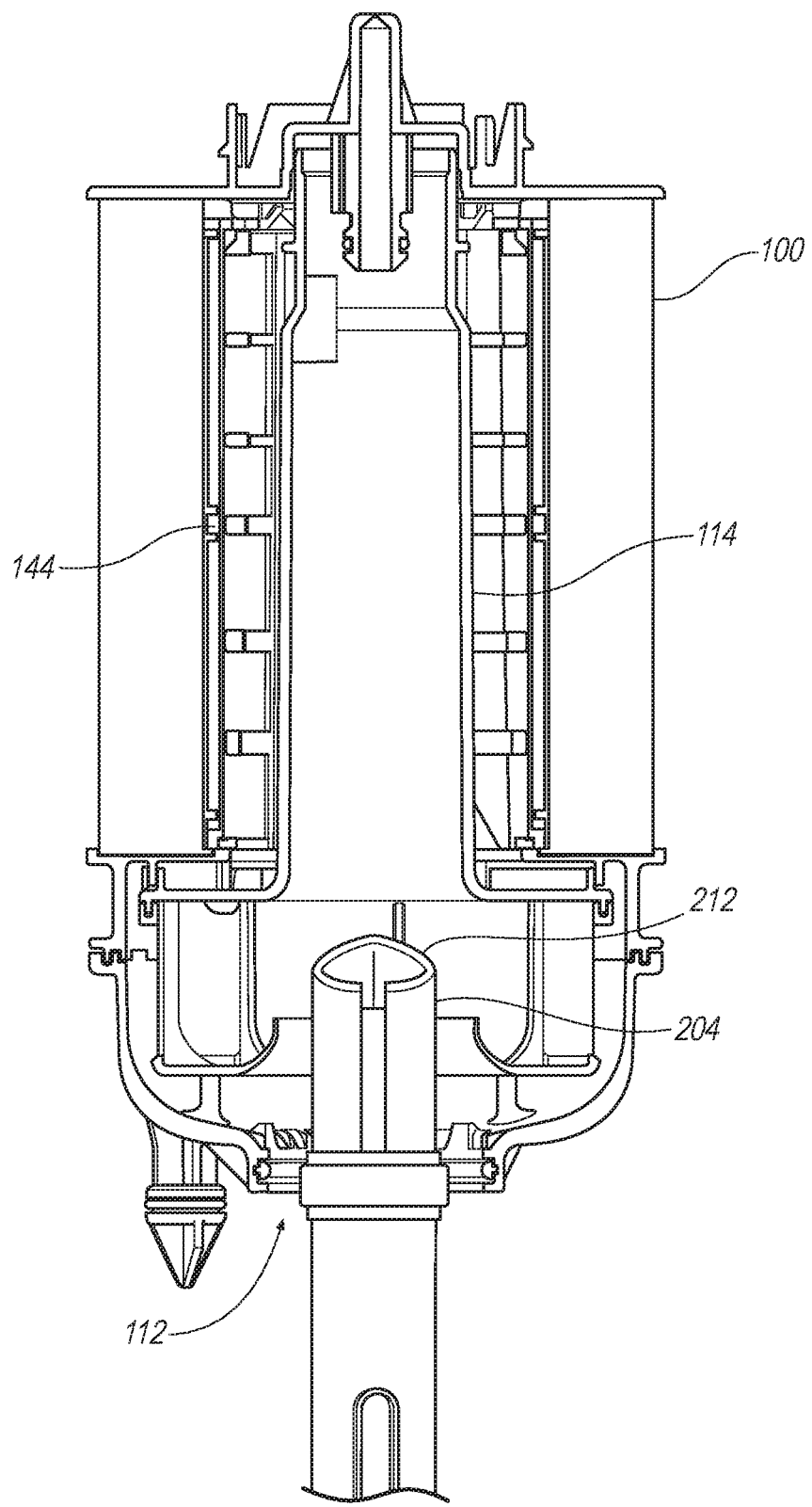

During assembly, center stack 200 is positioned within a cavity of a housing element and may be part of the housing, but as indicated above the housing is not shown for illustration purposes. Referring to FIG. 9A, at its base and in water separator 106, pin 108 extends downward from fuel filter 100 and is attached to water separator 106. Top portion 204 of center stack 200 extends upward and toward opening 112 of fuel filter 100. Curved surface 212 having maximum axial location 216 is thereby positioned to enter opening 112 when fuel filter 100 is installed within housing 800. FIG. 9B illustrates fuel filter 100 as it passes onto and over center stack 200, and as top portion 204 of center stack 200 extends into and along inner surface 144 of center support 114. Radial extension 202 includes outer diameter 236 that approximately matches with inner surface 144 of filter center support 114.

Curved surface 212 is positioned to engage against sword 134 as fuel filter 100 passes onto and over center support 114. However, because installation is performed without the installer (i.e., a person holding fuel filter 100 and passing it onto center stack 200) having line-of-site or being able to see the respective orientations, curved surface 212 engages with sword 134 so that fuel filter 100 is ultimately properly installed regardless of its initial angular orientation based on the continued following steps.

Figure 9C:
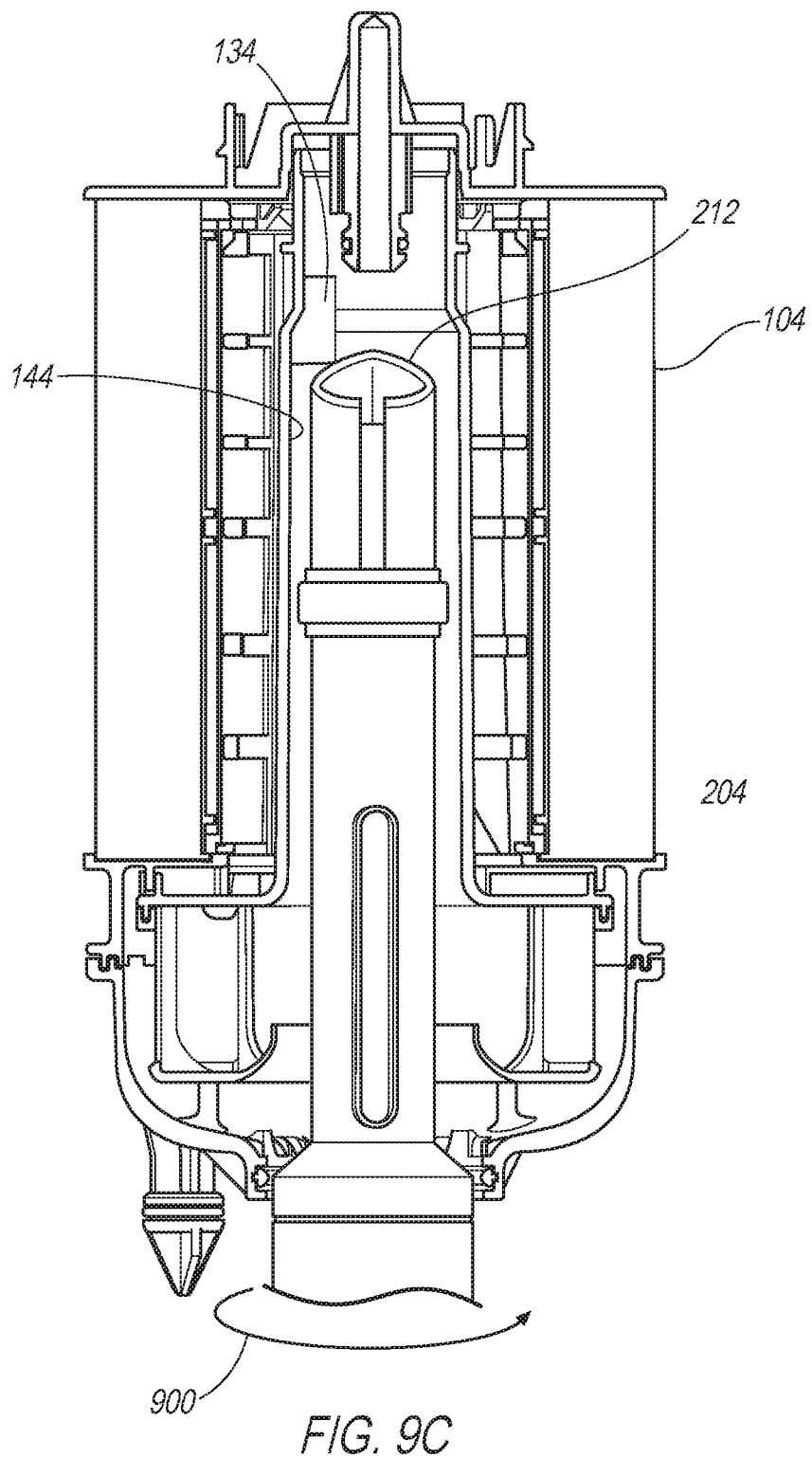
Figure 9D:
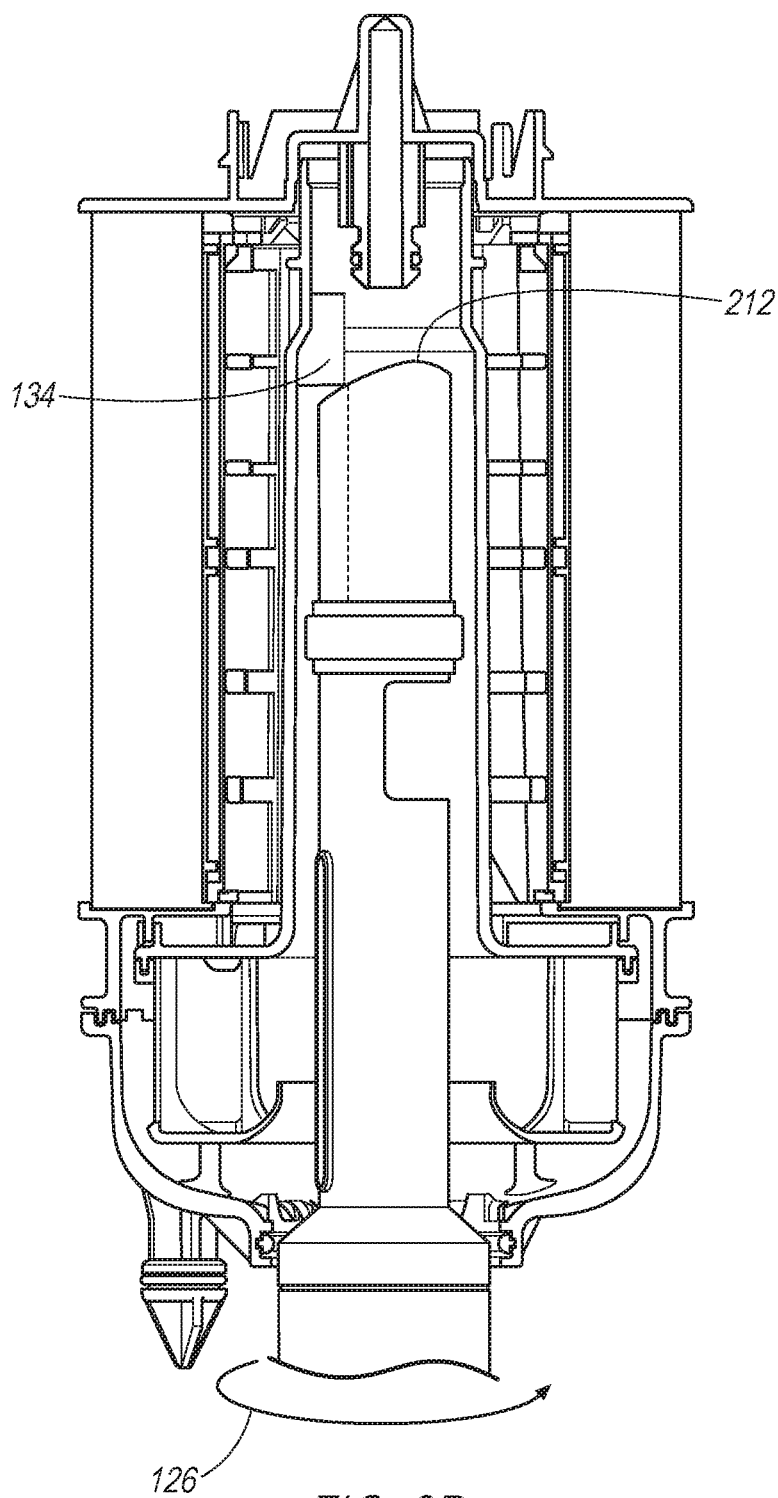

As seen in FIG. 9C, fuel filter 100 is installed to the point where curved surface 212 engages against sword 134. As can be seen, however, because of interference between curved surface 212 and sword 134, further insertion of fuel filter 100 is stopped. However, also because curved surface 212 is curved, fuel filter 100 is thereby caused to rotate 900. That is, as filter 100 continues on its axial path, once sword 134 engages against curved surface 212, a rotational moment is imparted upon fuel filter 100, and fuel filter 100 begins to rotate 900, as shown in FIG. 9D and at a subsequent further rotation seen in FIG. 9E.

Figure 9E:
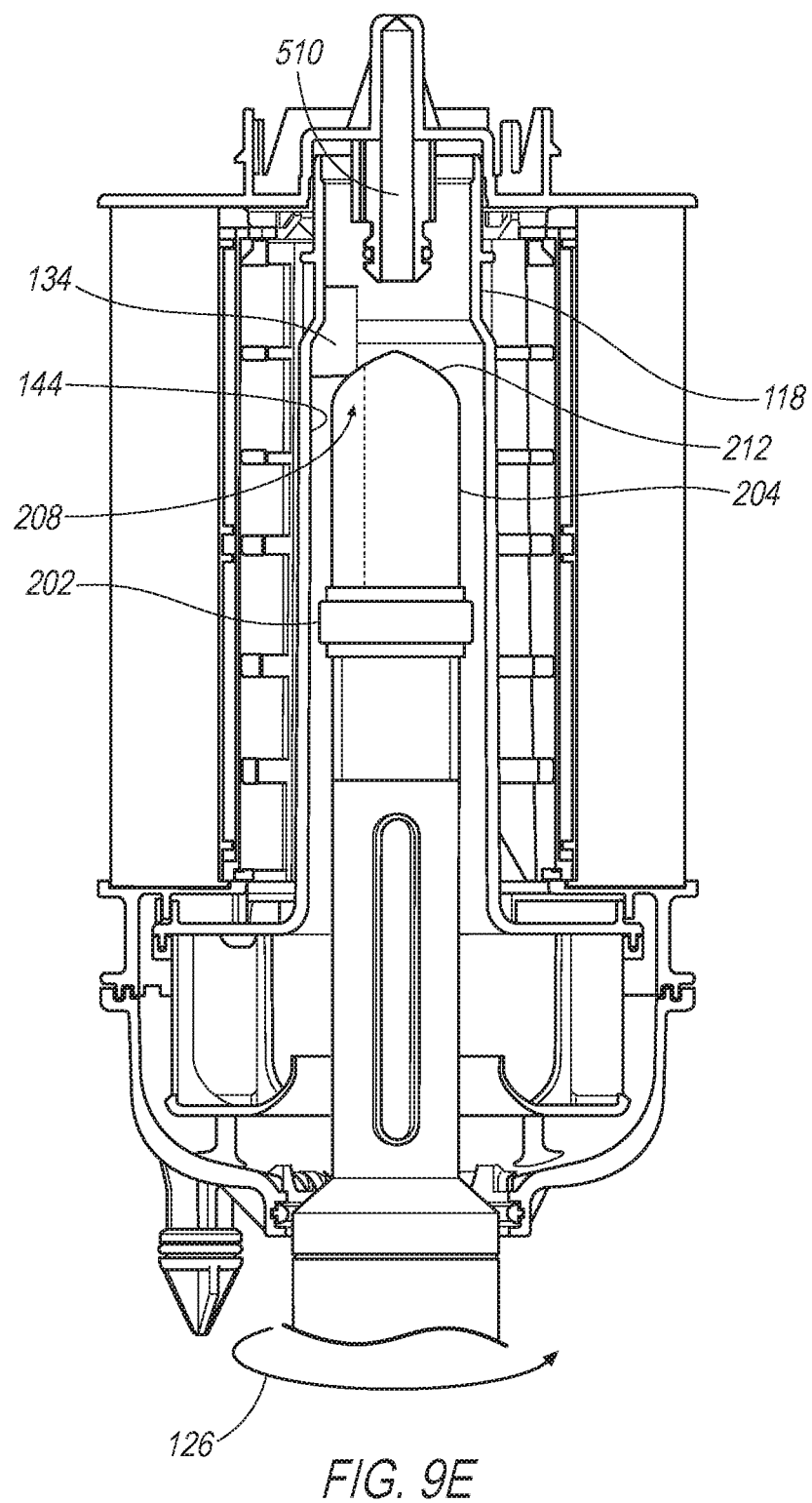

FIG. 9E shows fuel filter 100 at an angular orientation in which sword 134 of fuel filter 100 is aligned with slot 208 of center stack 200. Having slot 208 aligned with sword 134 thereby, by default, aligns pin 108 with its channel 810 in housing 800 so that pin 108 can thereby be pressed into channel 810, completing the installation of fuel filter 100 in housing 800.

Thus, in overall summary of installation and with respect to FIGS. 9A-9E, fuel filter 100 may be installed in its housing in such a fashion that, regardless of its beginning or initial angular orientation, curved surface 212 of center stack 200 will engage axially with sword 134 if the two are not yet, by happenstance, already aligned. That is, in most assembly procedures pin 108 will not be aligned with its channel 810 in housing 800, and engagement of curved surface 212 with sword 134 will thereby occur. Once sword 134 and curved surface 212 engage, the motion of such engagement against the angled or curved surface thereby causes rotation 900 to occur, until sword 134 is aligned with slot 208.

Further, because of the position of maximum axial location 216, it is contemplated that rotation 900 may be in the angular direction as illustrated, or it may be in the opposite angular direction depending on which side of maximum axial location 216 that curved surface 212 engages with sword 134. Curved surface 212 extends downwardly to either side of maximum axial location 216. Thus, if sword 134 engages curved surface 212 on one side of maximum axial location 216, then rotation 900 will be in one direction, and if sword 134 engages curved surface 212 on the other side of maximum axial location 216, then rotation will be in the opposite direction.

During assembly of fuel filter 100 onto center stack 200, damage can occur to the fuel filter or housing if components do fit properly or if interference fits occur, and which is avoided according to the disclosure. For instance, as discussed, when sword 134 engages with slot 208 of center stack 200, pin 108 is thereby pressed into its passageway or channel 810 in housing 800. Thus, if pin 108 is not properly aligned with channel 810, an interference can occur which can lead to damage of components if filter 100 is then forced into its location.

Also, during assembly, components are axially aligned so that components of the filter assembly fit into the housing, but without unintentionally engaging with the housing—which can also lead to damage. Likewise, if components do not fit radially with one another, damage can occur to components if, again, the filter is forced into its location against an interference.

In addition, fuel filter 100 includes features that prevent inadvertent cocking within the housing, to avoid binding of fuel filter 100 during installation. Accordingly, as seen in FIG. 2A, filter base 146 includes inner diameter 148 that is selected in conjunction with outer diameter 236 of radial extension 202 so that radial extension 202 can pass through inner diameter 148 during installation. Fuel filter 100 includes fuel filter center line 116 and center stack 200 includes center stack center line 234, as will be discussed.

Figure 10A:
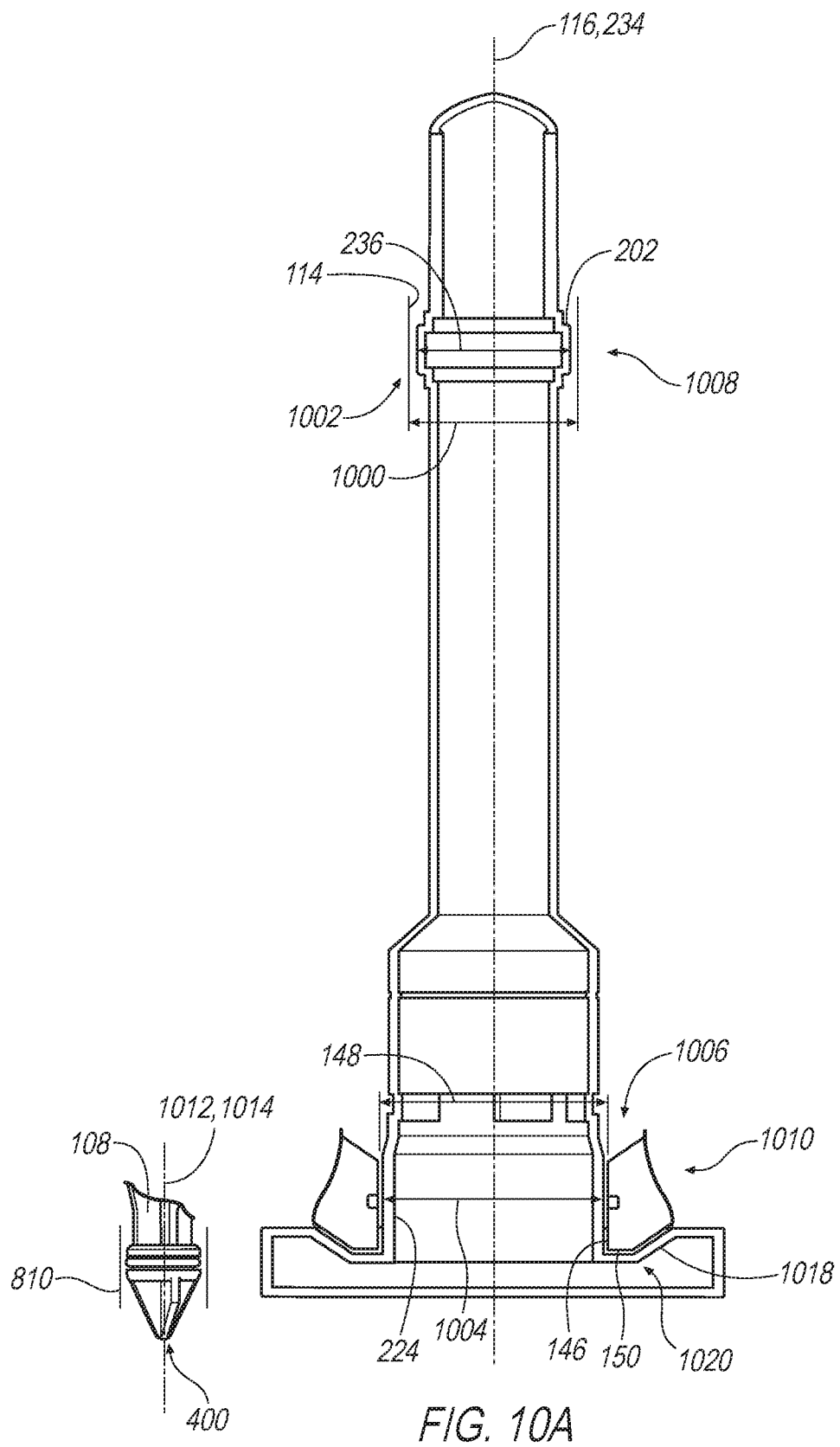
FIG. 10A shows a cross-sectional view and dimensional information for aligned filter and center stack.
Figure 10B:
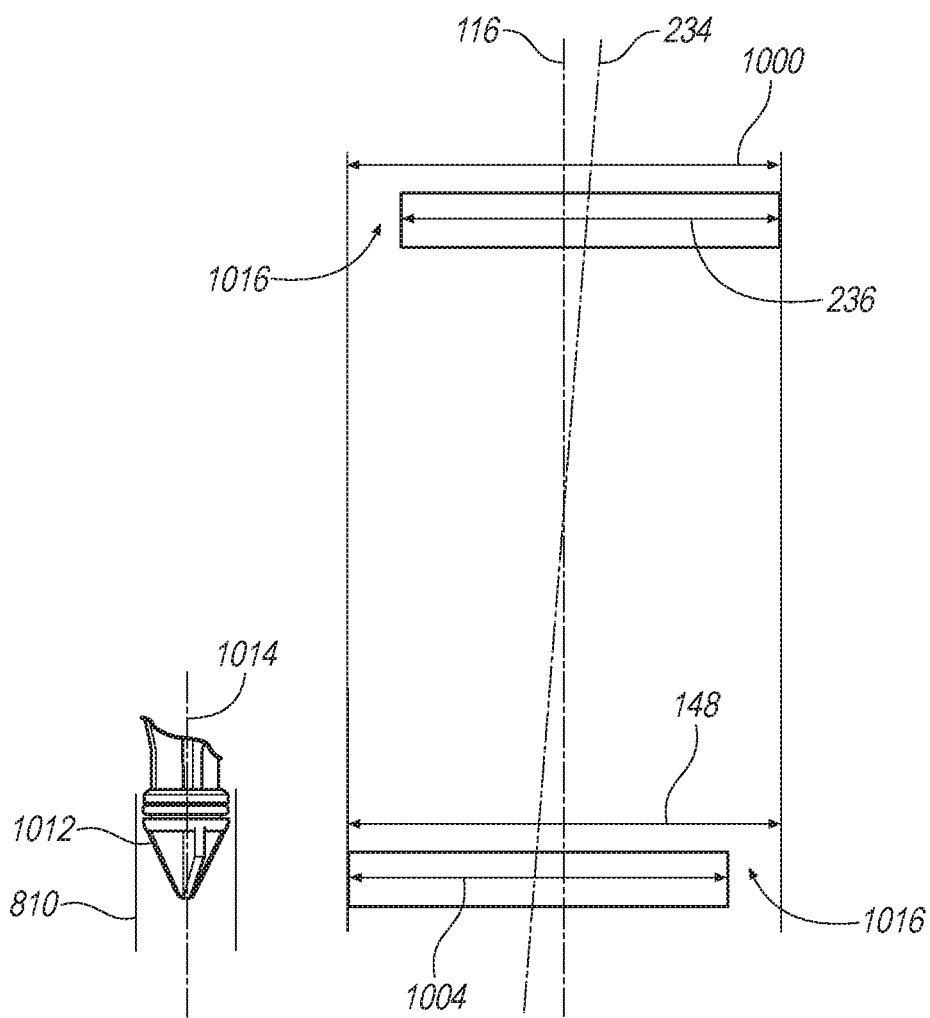
FIG. 10B is a graphical illustration of the fuel filter misaligned due to tolerance stackup.

As such, according to the disclosure and as shown in FIGS. 10A and 10B, radial extension 202 is positioned within inner surface 144 of center stack 200 and having a clearance therebetween that is nominally selected to minimize any radial clearance and also minimize the propensity for the fuel filter to cock or fall off kilter when in its housing. FIG. 10A shows related dimensional information for fuel filter 100 positioned nominally over center stack 200 (and with center lines 116, 234 aligned). FIG. 10B is a graphical illustration of fuel filter 100 positioned over center stack 200, but with center lines 116, 234 offset and angled from one another and based on a 'worst case' cocking of components due to misalignment as well as tolerance stack up, but that do not result in damage to any of the component parts according to the disclosure.

Inner surface 144 is at a bore or inner diameter 1000, thereby including a radial clearance 1002 that is a gap between outer diameter 236 of radial extension 202 and bore diameter 1000 when center lines 116, 234 are aligned. Filter base 146 of fuel filter 100 having inner diameter 148 fits over center stack base 224 having a base outer diameter 1004. Accordingly, a radial base gap 1006 is between inner diameter 148 and base outer diameter 1004. In other words, outer diameter 236 of radial extension 202 is nominally undersized from bore diameter 1000, resulting in radial clearance 1002 for components, even when center lines 116 and 234 are aligned. Base component 228 includes a groove 1018 for filter base 146.

Tolerances for component fabrication may be selected based on known tolerancing techniques such as geometric dimensioning and tolerancing (GDT), root sum square (RSS) analysis, or based on six sigma tolerancing, as examples. As such, according to the disclosure, tolerance fits at a first axial location 1008 between inner surface 144 and bore diameter 1000 are selected to meet appropriate manufacturing requirements, such as to meet 3 sigma, 4 sigma, or greater fits to ensure that radial clearance 1002 remains positive under most statistical conditions when many thousands of component parts are fabricated and fit together Likewise, inner diameter 148 and base outer diameter 1004 at a second axial location 1010 are also selected to meet statistical requirements so that radial base gap 1006 remains positive, as well.

During assembly, and as discussed, pin 108 is rotationally aligned with respect to housing 800 due to engagement of sword 134 with slot 208. Accordingly, pin 108 according to the disclosure includes point 400 that ensures pin 108 will enter its channel 810 within housing 800. Pin 108 is positioned or positionable within channel 810 and according to the disclosure pin 108 aligns with channel 810 under any worst-case scenario of statistical extremes that are achieved based on manufacturing tolerances of all relevant component parts. Thus, as seen in FIG. 10A and having component parts aligned on their respective centers, pin 108 having a center line 1012 aligned with channel 810 having a center line 1014.

Referring to FIG. 10B, center lines 116, 234 may be canted or off-alignment with one another due to each being on extremes of their tolerance ranges and during installation. That is, before axial extension 510 is positioned within hole 240 of center stack 200. For instance, outer diameter 236 of radial extension 202 may be on a low end of its tolerance band, and bore diameter 1000 may be at an upper end of its tolerance band, which may result in a maximum gap 1016 being formed when radial extension 202 is pressed to one extreme against inner surface 144 of center stack 200. Likewise, and again at an extreme, base outer diameter 1004 may be at a low end of its tolerance band while inner diameter 148 of fuel filter 100 may be at its maximum tolerance, which may result in a maximum gap 1016 being formed when filter base 146 is pressed against center stack base 224.

As such, when fuel filter 100 is positioned within filter housing 800, fuel filter 100 contacts center stack 200 at first axial location 1008, and fuel filter 100 contacts center stack base 224 of center stack 200 at second axial location 1010.

And, when filter base 146 is pressed or tilted against center stack base 224 at second axial location 1010 and in a direction that is 180° off from that at first axial location 1008, then under this condition tolerance stackup may result in a worst case tilt of fuel filter 100 with respect to center stack 200 during assembly, with maximum gap 1016 formed at one circumferential location 1008 and maximum gap 1016 formed at a different circumferential location 1010 that is 180° offset therefrom. As such, and according to the disclosure, point 400 of pin 108 is properly dimensioned to ensure that under even the worst case of tolerance stack up and misalignment of components, pin 108 will find channel 810 during assembly, such as when pin center line 1014 does not align perfectly with channel center line 1012.

Center line 116 illustrates a center of fuel filter 100, and center line 234 illustrates a center line of center stack 200, and the extremes of misalignment of both center lines 116, 234 are shown in FIG. 10B. And, because of the flexible nature of inner seal 140 and its minor interference with center stack base 224, any misalignment of fuel filter 100 and center stack 200 may thereby be tolerated and inner seal 140 will seal with center stack base 224 regardless of any misalignment due to radial tolerance stackups and misalignments of components.

Thus, with point 400 of pin 108 properly dimensioned, and taking into account the extremes of tolerances within the relevant components, point 400 under all circumstances will align with and enter channel 810 during assembly, while sealing of components is ensured.

As seen between the FIGS. 4A and 4B, the illustrated profiles are different from one another and according to the disclosure. That is, because of the radial alignment/tolerance aspects of fuel filter 100 and as described with respect to FIGS. 10A and 10B, the corresponding profile of pin 108 as seen in FIG. 4A is long and narrow. In contrast, because of the rotational installation of fuel filter 100 within housing 800, as fuel filter 100 rotates about, and with the engagement of sword 134 with curved surface 212, as described, rotation occurs until sword 134 engages with slot 208, and until pin 108 engages with channel 810. Accordingly, the corresponding profile of pin 108 in FIG. 4B is shorter and more blunt.

Figure 11A:
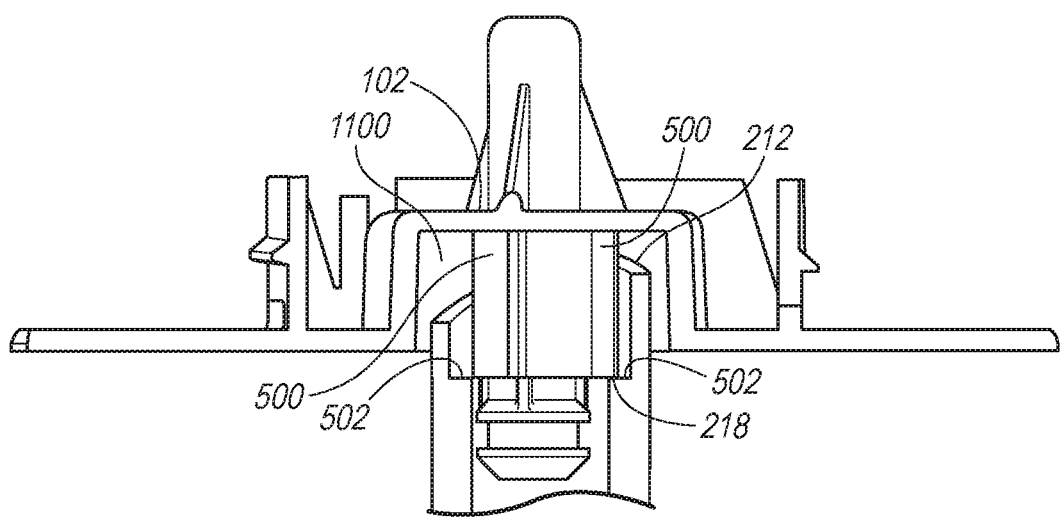
FIG. 11A is a side view of the end cap engaged with the top portion of the center stack.
Figure 11B:
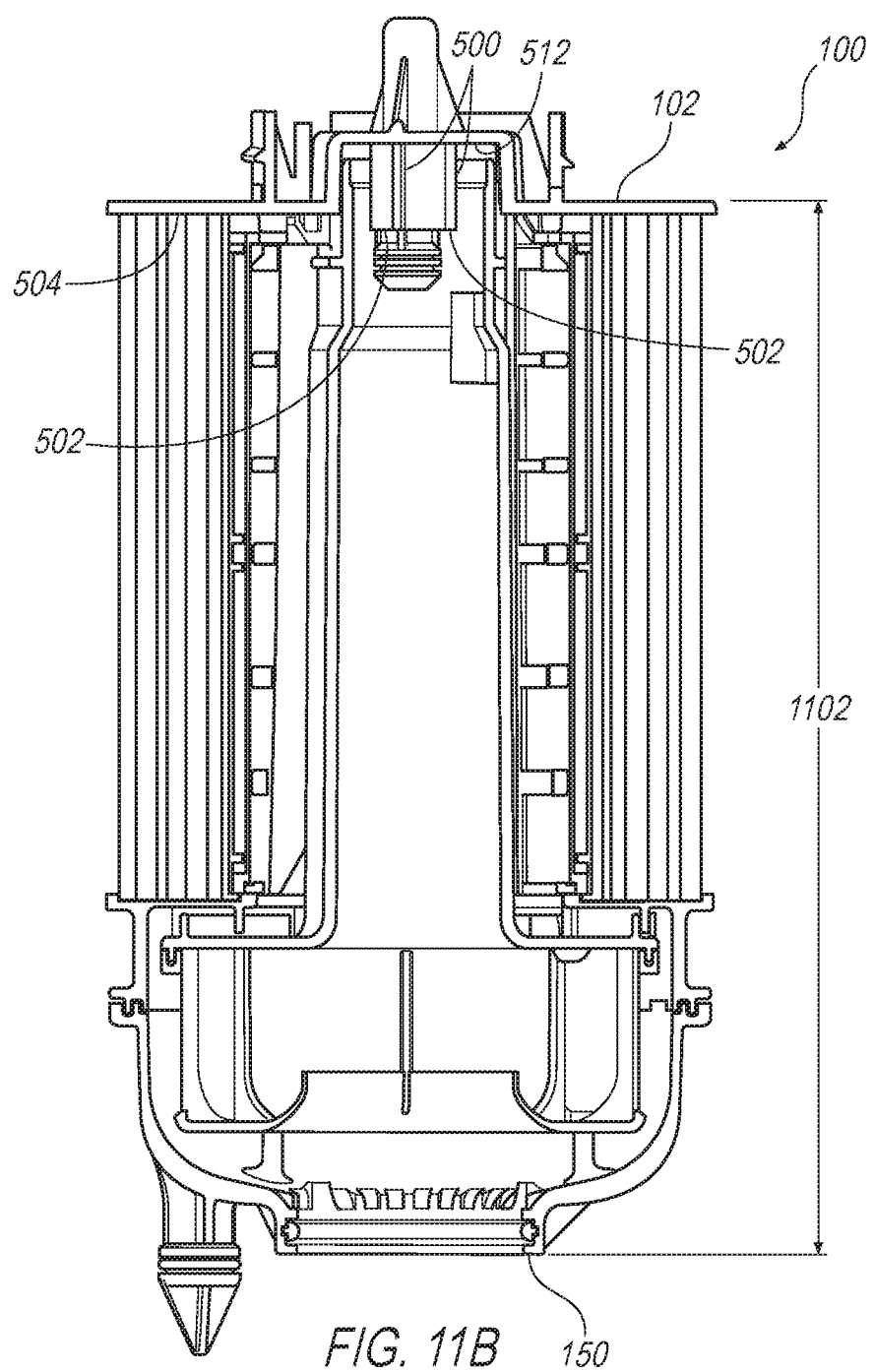
FIG. 11B shows a side view of the fuel filter and showing a relevant axial dimension for assembly.

As illustrated, fuel filter 100 includes end cap 102, shown also in FIGS. 5, 11A, and 11B. End cap 102 includes features that axially locate fuel filter 100 with respect to housing 800, which includes axially locating filter base 146 with respect to a base component 228 of center stack 200. As can be seen in the figures, such as FIG. 10A, base component 228 includes a circumferential clearance region or groove 1018 that is proximate and radially external to center stack base 224 and into which filter base 146 is positioned.

As discussed, base outer diameter 1004 fits within filter base 146, and as illustrated in FIG. 10B, misalignment of components may result in maximum gap 1016. As such, groove 1018 is likewise sized or toleranced such that sufficient radial space is present within groove 1018 to accommodate all such axial movement and misalignment of filter base 146 with respect to center stack base 224.

FIG. 5 is a cutaway of end cap 102, with engagement of prongs 500 with a surface of center stack 200 shown in view FIG. 11A. FIG. 11B shows a side view of fuel filter 100 and showing a relevant axial dimension for assembly. Each prong 500 includes a respective axial surface 502. Correspondingly, as seen in FIG. 3C, top portion 204 includes flat circumferential surface 218 that is inside of top portion 204. As such, during assembly of fuel filter 100 onto center stack 200, fuel filter 100 is pressed into position or otherwise installed to the point that axial surface 502 of each of prongs 500 engages against flat circumferential surface 218.

In addition, however, component parts are designed having proper stack up of dimensional tolerances to ensure that filter base 146 does not extend axially and to the point, when assembled, that there is axial interference between bottom surface 150 and groove 1018. Thus, according to the disclosure, component parts include sufficient tolerance to ensure that a gap 1020 is formed between parts.

Thus, referring back to FIG. 9E, component parts have not yet engaged axially and prongs 500 are not situated inside of top portion 204. As such, although not shown in FIGS.

9A-9E, it is understood that axial extension 510 is pressed into hole or aperture 240 within top portion 204 that is visible in FIG. 3C, axial extension 510 having an O-ring that engages with hole or aperture 240 and seals to prevent gas or other leakage from passing thereby. Thus, a final installation step is completed, in which axial extension 510 and the O-ring are positioned within hole or aperture 240 and during such installation, because pin 108 is aligned with its channel 810 via the engagement of sword 134 with slot 208. Because axial surfaces 502 of prongs 500 engage with flat circumferential surface 218, fuel filter 100 is thereby axially positioned with axial surfaces 502 providing a reference point from which axial tolerances of fuel filter 100 are established, according to the disclosure. A space or clearance 1100 above flat circumferential surface 218 provides sufficient axial and radial clearance such that curved surface 212 of upper end 210 of center stack 200 may be positioned therein and without interference.

Axial surfaces 502 of end cap 102 thereby provide a base reference frame from which axial tolerances are established so that under all conditions of manufacturing tolerances that may be experienced during fabrication of all relevant components, no axial interference will occur between bottom surface 150 of filter base 146. That is, having axial surfaces 502 form a base or reference frame, end cap undersurface 504 is thereby tolerance-controlled from axial surfaces 502. A dimension within fuel filter 100 is thus determined based on a dimensional distance from axial surfaces 502 to end cap underside 512, and from there to bottom surface 150 (FIG. 11B). Dimensional distance 1102 thereby extends from axial surfaces 502 to bottom surface 150. Correspondingly, and referring to FIG. 10A, because flat circumferential surface 218 supports axial surfaces 502, and because filter base 146 fits into groove 1018 but such that bottom surface 150 does not contact groove 1018, gap 1020 is ensured, while taking into account all tolerance stackups between components during manufacturing and assembly of all components.

In such fashion, each profile 422, 424 of pin 108 includes surfaces as shown that correspond favourably with installation and tolerance stackups that may occur in fuel filter 100 and center stack 200. For instance, as fuel filter 100 is rotated about curved surface 212, as pin 108 engages with channel 810 it is profile 424 that is relevant, in that point 400 finds channel 810 readily and as sword 134 engages with slot 208. Accordingly, a more blunt profile as seen in profile 424 favourably combines with the fit of sword 134 with slot 208 to ensure that both sets of features engage at the same time. On the other hand, profile 422 is more relevant to any radial mis-alignment of components that may occur, and as described with respect to FIGS. 10A and 10B. As such, a longer and flat, single flat 416, thereby accommodates more favourably any misalignment of components. As such, and according to the disclosure, pin 108 includes two profiles, where profile 422 includes single flats 416, and profile 424 includes both axial portions 418 and angled flats 420.

Figure 12:
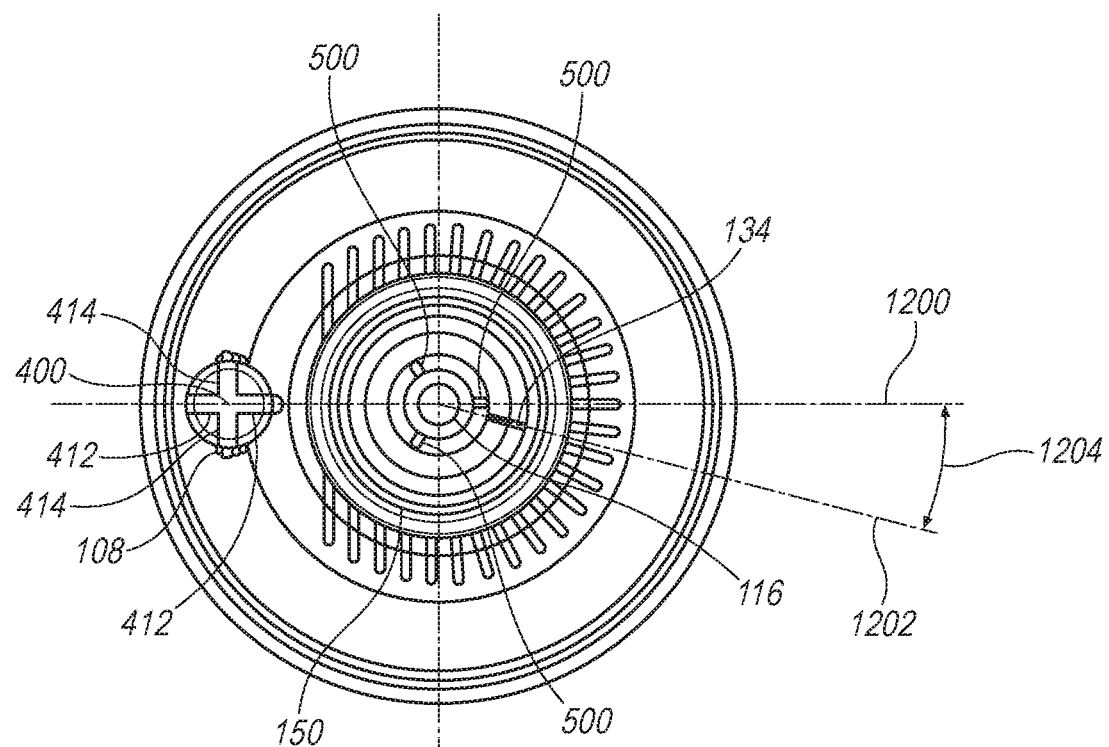
FIG. 12 is a plan view of the bottom of the fuel filter.

FIG. 12 is a plan view of the bottom of fuel filter 100 and showing bottom surface 150. As seen therein, pin 108 includes first ribs or fins 412 that extend radially, and second ribs or fins 414 that extend circumferentially. Prongs 500 are visible, as well as sword 134. As seen therein and according to the disclosure, fuel filter center line 116 extends through the center of fuel filter 100, and pin 108 includes point 400 that extends along a radial line 1200 from point 400 to fuel filter center line 116. Sword 134 also extends in a radial direction and along a sword radial line 1202. Sword 134 is thereby offset an angle 1204 that, in one example, is approximately 15° from radial line 1202. However, angle 1204 may be any angle, such as 0°, 30°, 90°, or 110°, as examples.

Figure 13:
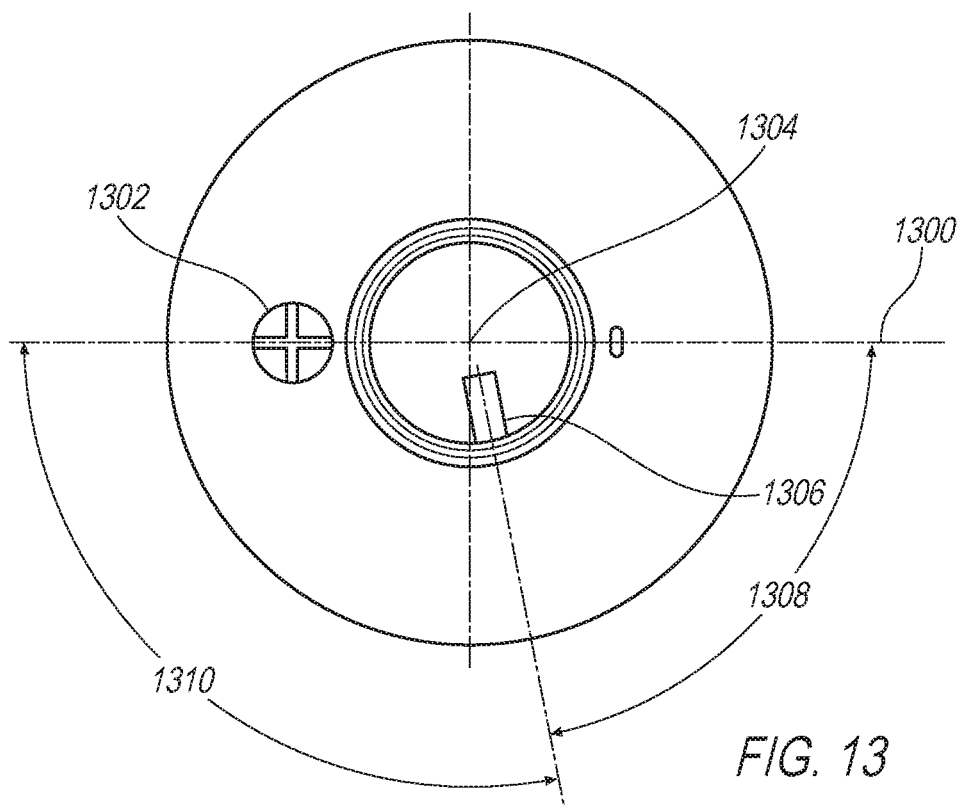
FIG. 13 is a plan view of the bottom of the fuel filter.

The angular relationship between sword 134 and pin 108 thereby defines a corresponding angular orientation between channel 810 and slot 208 of center stack 200. In such fashion, it is contemplated that different designs of a fuel filter, for different applications, may therefore be designed having a different angular orientation of components, which may be known as a "poka-yoke" to ensure that the wrong component is not installed into a housing. For instance, one fuel filter may be designed for a particular housing and with a particular angular orientation of components as illustrated in FIG. 12. However, another fuel filter for an entirely different vehicle may likewise be designed with the same housing. For this second or alternate design, although the fuel filter may physically fit within the housing, such filter may not function properly in a different engine. Or, having the wrong filter may alternatively cause damage to the engine. Thus, a housing may be designed having a particular center stack, such as center stack 200, and with an appropriate set of mating features for locating the fuel filter according to the disclosure. But, if the wrong filter is installed, then a sword-slot alignment with respect to a given channel-pin may result in avoiding the wrong filter from being installed. For instance, referring to FIG. 13, a plan view of the bottom of fuel filter 100 includes a radial line 1300 extends through a center of pin 1302 and through a centerline 1304. A sword 1306 is positioned, in one example, 77.5° offset 1308 from radial line 1300, or complementarily 102.5° offset 1310 therefrom. In the illustrated example, offset 1310 is 102.5° as shown, and in one example it is contemplated that sword 1306 is offset within +/−2.5° of the illustrated angle 102.5°.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain arrangements, and should in no way be construed so as to limit the claimed invention.

Accordingly, it is to be understood that the above description is intended to be illustrative and not restrictive. Many applications other than the examples provided would be upon reading the above description. It is anticipated and intended that future developments will occur in the arts discussed herein, and that the disclosed systems and methods will be incorporated into such future arrangements. In sum, it should be understood that the invention is capable of modification and variation.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:
1. A fuel filter assembly, comprising:
a filter housing having an outer wall defining a cavity;

a center stack having a base component and a top portion, wherein the center stack is positioned within the cavity of the filter housing and attached to the filter housing, the center stack having an aperture in the top portion and a circumferential surface; and a fuel filter that includes:
a filter base;
an end cap having a top surface and a bottom surface opposite the top surface, an axial extension that is integral to and extends from the bottom surface at a first end to a groove at a second end of the axial extension opposite the first end, and at least one prong attached to the axial extension, the at least one prong having an axial surface facing away from the top surface that axially locates the fuel filter in the filter housing and against the circumferential surface of the center stack, the axial surface located between the bottom surface and the groove, and the second end engages with the aperture of the center stack for sealing between the fuel filter and the center stack;
a filter element attached to the bottom surface of the end cap; and
a pin attached to a filter base.

2. The fuel filter assembly of claim 1, the base component of the center stack having a top surface and the filter base including a bottom surface, an axial gap being formed between the top surface of the base component of the center stack and the bottom surface of the filter base.

3. The fuel filter assembly of claim 1, wherein the end cap includes a space above the axial surface to provide clearance for an upper end of the center stack.

4. The fuel filter assembly of claim 3, wherein the base of the filter includes a water separator at the filter base.

5. The fuel filter assembly of claim 1, wherein the pin includes a first set of fins and a second set of fins that are orthogonal to the first set of fins, wherein a profile of each of first set of fins is different from a profile of each of the second set of fins.

6. The fuel filter assembly of claim 1, further comprising:
wherein the fuel filter further includes the filter element having a raw end and a particle free end for fuel flow, and a hydrophobic diaphragm; and
wherein the center stack has a fuel access aperture and a fuel discharge port.

7. The fuel filter assembly of claim 1, wherein the circumferential surface is flat.

8. The fuel filter assembly of claim 1, wherein the axial surface of the at least one prong is flat.

9. The fuel filter assembly of claim 1, wherein the fuel filter further includes a sword for circumferentially locating the fuel filter with respect to the center stack, and the axial surface is located between the end cap and the sword.

10. The fuel filter assembly of claim 1, further comprising an O-ring in the groove.

11. The fuel filter assembly of claim 1, wherein the second end includes a groove, and the second end extends into the aperture such that the groove is contained within the aperture.

12. A method of installing a fuel filter into a filter housing comprising:
positioning a center stack within a cavity of the filter housing;
positioning the fuel filter such that an axial surface of the fuel filter engages with a circumferential surface of a center stack in the filter housing to axially locate the fuel filter within the filter housing and with respect to the center stack, the fuel filter having an end cap with an axial extension that is integral thereto, wherein the axial extension fits into an aperture of the center stack of the filter housing and the axial extension engages the fuel filter with the center stack to seal between the fuel filter and the center stack.

13. The method of claim 12, further comprising:
attaching a filter element to an undersurface of the end cap;
positioning a water separator at a filter base of the fuel filter;
engaging the filter base with a base component of the center stack; and
attaching a pin to the water separator.

14. The method of claim 13, further comprising forming an axial gap between a top surface of the base component and a bottom surface of the filter base.

15. The method of claim 12, wherein the axial extension includes a groove, and positioning the fuel filter further comprises positioning the fuel filter such that the groove is contained within the aperture.

16. The method of claim 15, further comprising positioning an O-ring on the groove.

17. The method of claim 15, wherein the axial extension includes at least one prong, and the axial surface is an axial surface of the at least one prong, and positioning the fuel filter further comprises positioning the fuel filter such that the axial surface of the at least one prong engages with the circumferential surface of the center stack.

18. The method of claim 17, wherein the at least one prong includes three prongs.

19. The method of claim 18, further comprising engaging an O-ring of the axial extension with a hole of the upper end of the center stack.

20. A fuel filter, comprising:
a filter base;
an end cap having a top surface and a bottom surface opposite the top surface, an axial extension that extends from and is integral to the bottom surface of the end cap and axially locates the fuel filter against a circumferential surface of a center stack, the axial extension engaging with an aperture of the center stack for sealing between the fuel filter and the center stack, the center stack positioned within a cavity of a filter housing and attached to the filter housing;
a filter element attached to the bottom surface of the end cap;
a water separator at the filter base; and
a pin attached to the water separator.

21. The fuel filter of claim 20, further comprising:
a filter center support having a first portion extending along a first axial length; and
a second portion extending along a second axial length;
wherein the first portion includes a first inner diameter that is greater than a second inner diameter of the second portion, and having a first inner contact surface at the first inner diameter that radially locates the fuel filter within the filter housing; and
wherein the center stack is positioned within the filter housing and attached to the filter housing.

22. The fuel filter of claim 20, wherein an axial gap is formed between a top surface of the filter housing and a bottom surface of the filter base; and
wherein the center stack is positioned within the filter housing and attached to the filter housing.

23. The fuel filter of claim 20, wherein the axial surface engages with an upper surface of the filter housing to axially locate the fuel filter in the filter housing; and wherein the center stack is positioned within the filter housing and attached to the filter housing.

24. The fuel filter of claim 20, wherein the axial surface is flat.

25. The fuel filter of claim 20, wherein the axial extension extends from the bottom surface at a first end to a groove at the second end of the axial extension opposite the first end, the axial surface located between the bottom surface and the groove.

26. The fuel filter of claim 25, further comprising an O-ring in the groove.

27. The fuel filter of claim 20, wherein the axial extension includes at least one prong attached to the axial extension, the at least one prong having an axial surface facing away from the top surface that axially locates the fuel filter against the circumferential surface of the center stack.

28. The fuel filter of claim 27, wherein the at least one prong includes three prongs.

29. The fuel filter of claim 27, wherein the axial extension includes a groove that is contained within the aperture.

* * * * *